US012568256B2

(12) United States Patent
Santoshi et al.

(10) Patent No.: US 12,568,256 B2
(45) Date of Patent: Mar. 3, 2026

(54) INSTANTANEOUS MEDIA STREAM TRANSCRIPTION SYSTEMS AND METHODS

(71) Applicant: Atlassian US, Inc., San Francisco, CA (US)

(72) Inventors: Vishal Santoshi, Tenafly, NJ (US); Wilbert Yan-Lok Lam, Bothell, WA (US); Sergio Figueiroa Pereira, Naperville, IL (US)

(73) Assignee: ATLASSIAN US, INC., San Francisco, CA (US)

( * ) Notice: Subject to any disclaimer, the term of this patent is extended or adjusted under 35 U.S.C. 154(b) by 68 days.

(21) Appl. No.: 18/759,644

(22) Filed: Jun. 28, 2024

(65) Prior Publication Data

US 2026/0006266 A1 Jan. 1, 2026

(51) Int. Cl.
*H04N 21/234* (2011.01)
*G10L 15/26* (2006.01)

(52) U.S. Cl.
CPC ....... *H04N 21/23418* (2013.01); *G10L 15/26* (2013.01)

(58) Field of Classification Search
CPC .......................... H04N 21/23418; G10L 15/26
See application file for complete search history.

(56) References Cited

U.S. PATENT DOCUMENTS 9,641,566 B1 5/2017 Hiremath
11,785,282 B1 10/2023 Goel et al.

OTHER PUBLICATIONS

Raschka, Sebastian, Understanding Large Language Models—A transformative Reading List, posted Feb. 7, 2023, <https://sebastianraschka.com/blog/2023/llm-reading-list-html>, [retrieved from Internet Jan. 13, 2025}.

*Primary Examiner* — Anthony Bantamoi
(74) *Attorney, Agent, or Firm* — Alston & Bird LLP

(57) ABSTRACT

Systems and methods for instantaneous media stream transcription are provided. In one embodiment, a method is disclosed that includes a server receiving a media stream object containing a recording (received in segmented chunks at discrete time intervals) initiated on a user device. The method includes storing the segmented chunks and generating a partial transcript of the recording as they are received. The method also includes receiving a publication request for a complete video file of the recording from the user device at a publication request time, and generating a complete transcript from the partial transcript and a manifest of the complete video file. Finally, the method includes providing access to the complete transcript to a viewer within an instant timeframe from the publication request time, where the instant timeframe is of constant order, independent of a length of the complete video file, and on an order of seconds.

19 Claims, 22 Drawing Sheets

510

522

516    514    512

≡ ☀    Testing App Instant Transcript Feature    {+} Add variable | ⋯ ∂ ( ⚲ Share ) | ⚲ ✿ ◑

Your video title, instantly created

App AI automatically generated a title based on your video's content.

( Manage    ⚙ )

540    Edit    Activity    Transcript    Views    Settings »

532    You can now edit your video using the transcript!    ( ⸜ Try it out )

( ⚲ Search ) ( ⎘ Copy ) ( ✎ Correct ) ( ⬇ Download )

502

534    0:00 So here we're testing the app's instant ⎘  transcript feature just released in the last month So here I'm recording the meeting over the app Uhm, so Kevin how do you think we should proceed Well What I'm saying here is I think we really need Steve's input

▷ ↺ ↻ ◀))    0:00 / 1:25    ☐ �䷀ ⚙ ☐ ☐ ⟦⟧

( ⊟ Comment | ☺☺☺ )

504

506

0:24 on the features, and it's going to be very important Sounds good. Steve what do you think  about the transcript user interface Everyone we're excited to work on this.

0:36 We currently have a 37 second recording Let me show you the transcript panel I'm opening the editor and I'm going to make a few changes type in some text to correct one entry with the app So the whole point here is to get the the the concept of the environment and to test the app

508

1:03 Instant Transcript Feature And the key question we're going to examine is the difference between existing graphical user interfaces for creating instant transcripts and this one Okay great so I'm going to stop the recording for now and examine other features

Summary
Generated by App AI ( ⎗ 21 views
View engagement ⌄ )

⧉    In this video, I test the recently released instant transcript feature    🔒    (?)

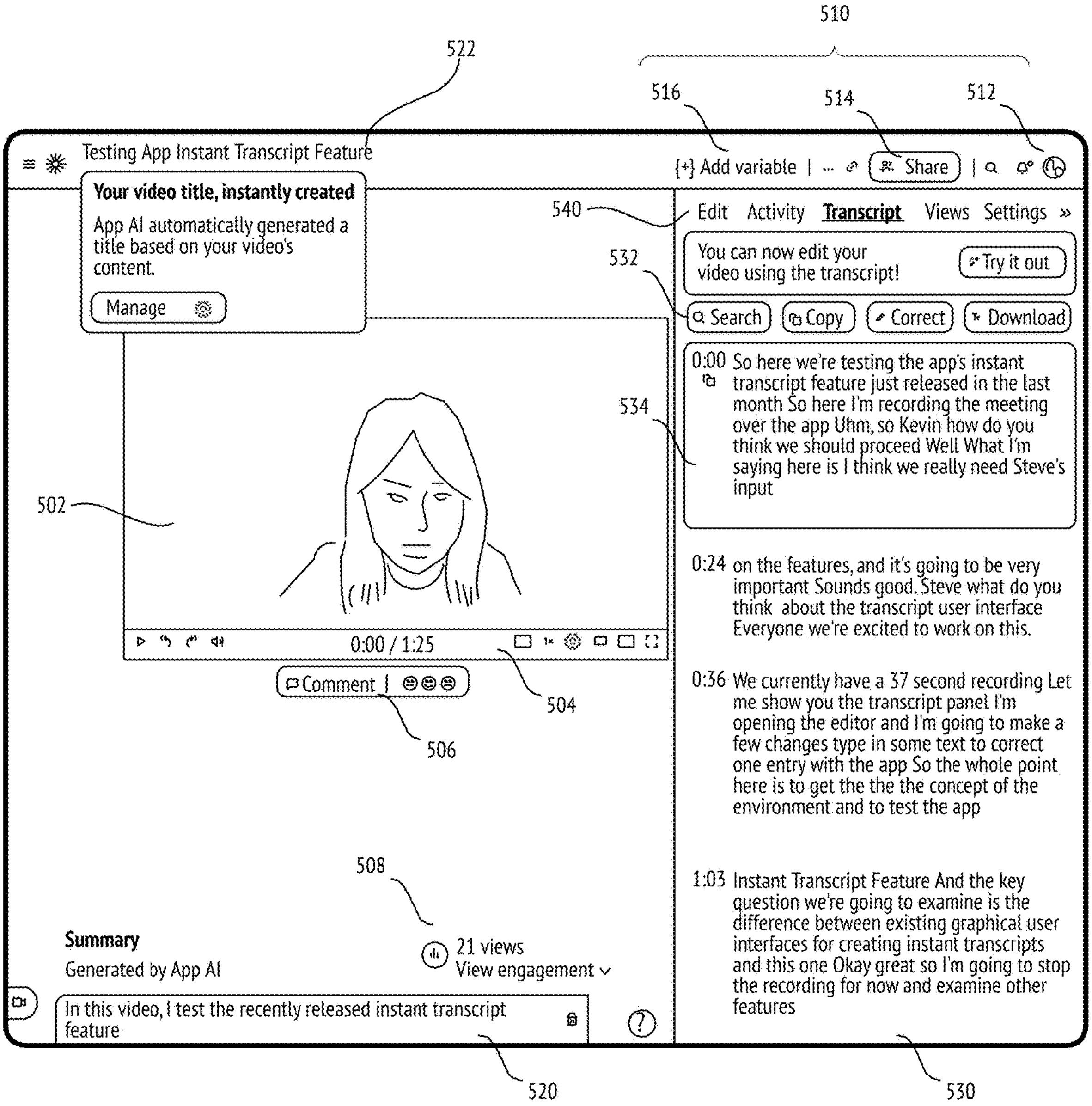

Establish a communication channel between a user device and a server device.

1104

Receive by the server device, through the communication channel from the user device, a media stream object containing a recording initiated on the user device, where the recording is received in segmented chunks at discrete time intervals from the user device.

1106

Store the segmented chunks of the recording to storage as the segmented chunks are received.

1108

Generate a partial transcript of the recording or update the existing partial transcript as segmented chunks are received.

1110

Receive a publication request for a complete video file from the user device at a publication request time.

1112

Generate a complete transcript for the complete video file from the partial transcript and a manifest of the complete video file.

1114

Provide access to the complete transcript for the complete video file to one or more viewers within an instant timeframe from the publication request time, where the instant timeframe is of constant order, independent of a length of the complete video file, and on an order of seconds.

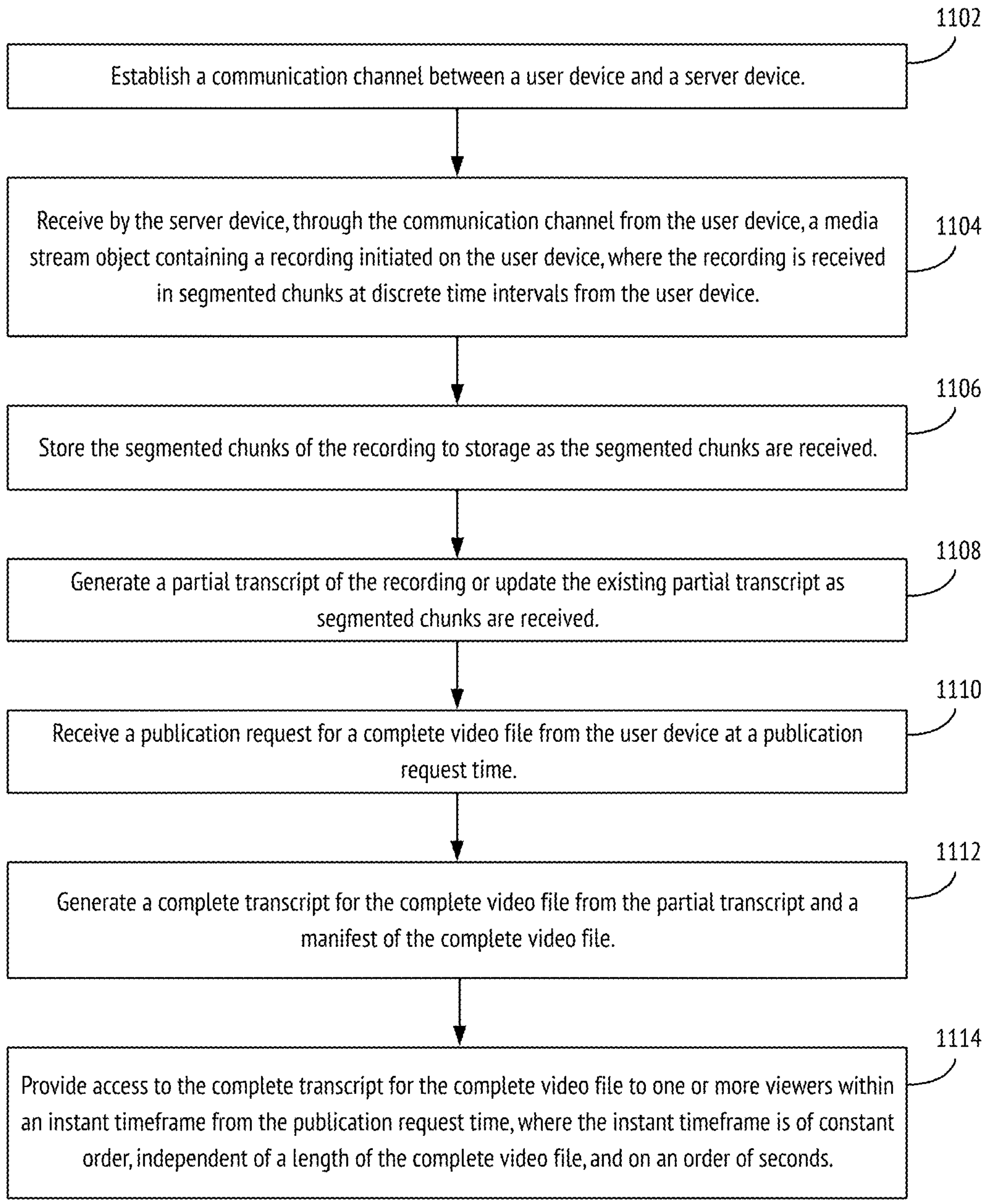

Establish a communication channel between a user device and a server.

1204

Receive, at the user device, a hyperlink to a complete video file stored at the server, the complete video file containing a recording from an other user device.

1206

Receive, at the user device, a viewing request for viewing the recording.

1208

Transmit the viewing request from the user device to the server in response to receiving the viewing request.

1210

Receive, from the server, through the communication channel to the user device, a media stream object containing the recording from the other user device.

1212

Receive, at the user device, a complete transcript of the complete video file from the server.

1214

Provide for display the complete video file and the complete transcript accessible and ready for viewing at the user device within an instant time frame, where the instant time frame is of constant order, independent of a length of the complete video file, and on an order of seconds, from a time a publication request was made on the other user device.

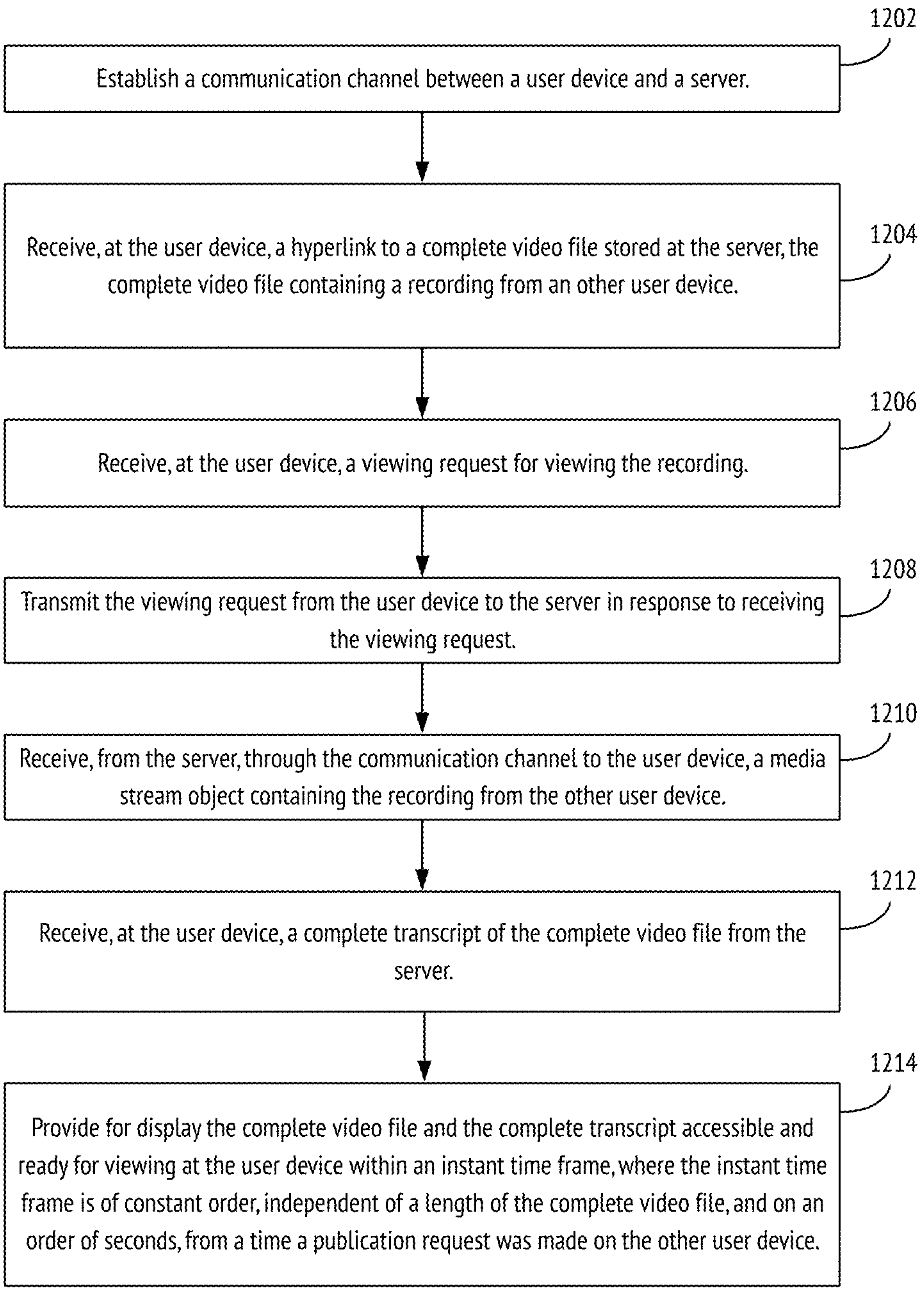

Establish a communication channel between a user device and a server

1630

Receive a media stream object containing a recording of a screen of the user device through the communication channel, where the recording is received as it is recorded on the user device

1640

Store the recording to permanent storage as it is received by the server

1660

Receive a publication request from the user device, where the publication request is received from a user at a publication request time

1670

Make the recording accessible to one or more viewers within an immediate time frame by generating, from recording, a complete video file ready for download by the one or more viewers, where the immediate time frame is a time to upload a remaining number of bytes to the server from the publication request time plus a time to complete processing the remaining number of bytes to generate the complete video file.

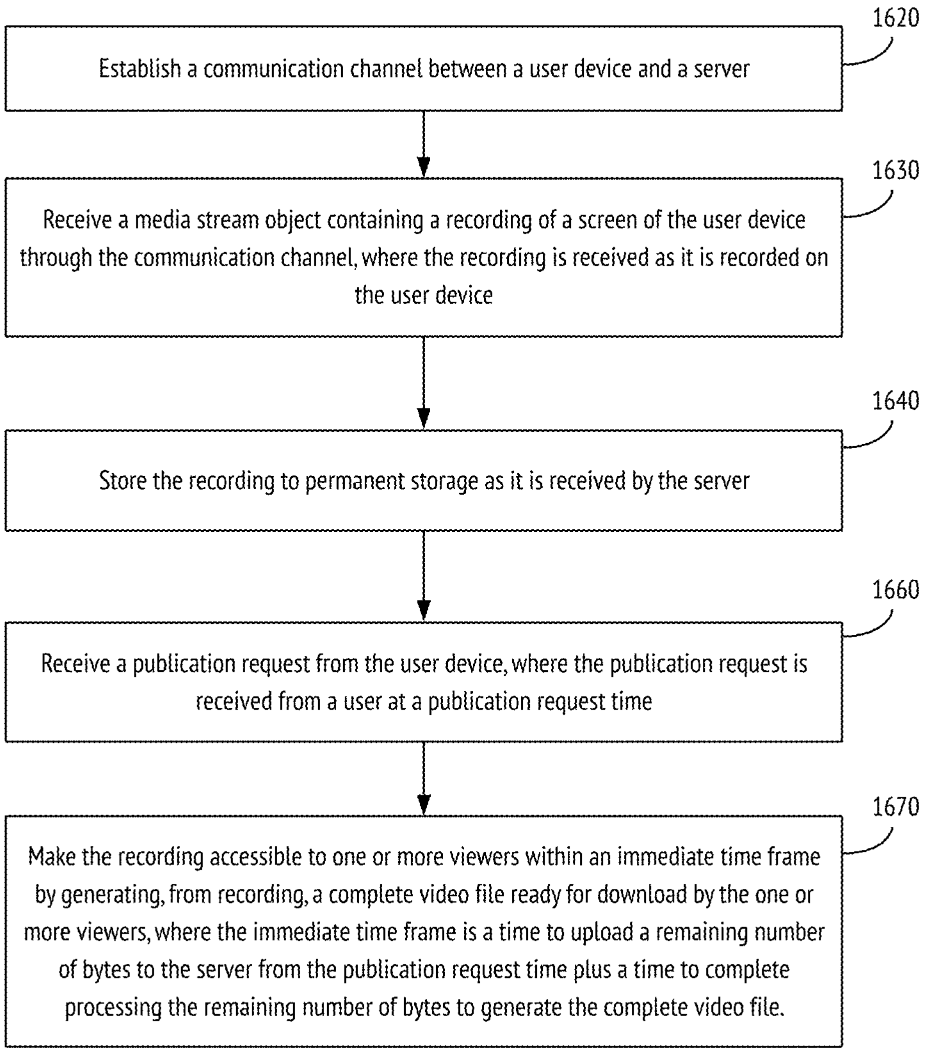

FIG. 16

INSTANTANEOUS MEDIA STREAM TRANSCRIPTION SYSTEMS AND METHODS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365 (c), and any and all parent, grandparent, great-grandparent, etc. applications of such applications are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

U.S. Pat. No. 11,785,282, issued on Oct. 10, 2023, entitled "Web-Hosted Video Recording and Associated Systems and Methods," describes methods and systems for loginless video recording from a third-party website viewed on a user device.

U.S. Pat. No. 9,641,566, issued on May 2, 2017, entitled "Methods and Systems for Instantaneous Asynchronous Media Sharing," describes methods and systems for instantaneous asynchronous media sharing.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the invention are in the field of media stream (i.e., audio and/or video) recording, and pertain particularly to methods and systems for transcription of media streams.

BACKGROUND OF THE INVENTION

The statements in the background of the invention are provided to assist with understanding the invention and its applications and uses, and may not constitute prior art.

Given the tremendous growth of social networking and remote applications for businesses, streaming media—encompassing streaming audio and streaming video—has become crucial in everyday communication. Various methods for media recording and sharing have emerged over time to provide the best quality experience to users. Recording and sharing media asynchronously and instantaneously has proven to be a powerful feature that offers multiple advantages and has numerous potential applications. In addition, the use of artificial intelligence (AI-) assisted features is further expanding services geared to recording and sharing media (e.g., videos) online.

Several AI-assisted features may be added to an online media recording and sharing service. Many of these AI features rely on media (i.e., audio and/or video) transcripts. For example, suggested titles may be automatically generated for recordings from a transcript. The conventional process for generating media transcripts involves producing transcripts after the recording session is completed by extracting the audio and submitting it to a transcription service. Once the recording session is completed, such a conventional process is able to generate media transcripts within a time that is proportional to the media length. Such a delay is not viable in asynchronous and instantaneous media sharing. There is hence a growing need for a process that is capable of generating instantaneous media transcription.

Nonetheless, current implementations of media transcription are hardly instantaneous, often tracking the speaker's sentence breaks, thus potentially causing additional delays. In addition, they are prone to issues such as semantic errors, contextual errors, incorrectly identified technical jargons and proper names.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Embodiments of the present invention provide an artificial intelligence (AI) based system for the instantaneous transcription of a media (e.g., video, audio, etc.) stream for an online media recording and sharing service. While available transcription services are not scalable or suffer from context loss or low-quality results, embodiments of the provided system use a live video and audio feed from recorders scalably, without adding bandwidth demands on the customer side or requiring any modifications to existing recording clients, thus ensuring that old recorder versions would benefit from instantaneous transcription transparently.

Embodiments of the system are based on processing real-time audio in chunks and hosting the AI infrastructure for transcription, thus allowing a scalable system that works in real-time, maintains context and accuracy, and supports enhancements such as improved timestamp accuracy, hallucination prevention, and silence detection. The system performs effectively for both short and long videos.

Instantaneous video transcription would have multiple benefits. It would make contents accessible to viewers constrained in perceiving audio, such as those deaf or hard of hearing, those who want to use a low volume for privacy concerns in public, or those who are not fluent in the language being spoken. Combined with translation, instantaneous video and media transcription would also offer multi-language support to a global audience. Instantaneous video transcription would also further enable analytical functionalities such as content search, indexing, analysis, topic recognition, and sentiment analysis.

According to a first aspect, various systems, devices, servers, and apparatus for instantaneous media stream transcription are within the scope of the present invention. In one embodiment, a system for instantaneous media stream transcription is disclosed. The system may include at least one processor and a non-transitory storage medium storing program code. The program code may be executable by the at least one processor and may cause the at least one processor to execute a process for instantaneous media stream transcription.

Specifically, the program code may include code to establish a communication channel between a user device and a server device. The program code may include code to receive by the server device, through the communication channel from the user device, a media stream object containing a recording initiated on the user device, where the recording may be received in segmented chunks at discrete time intervals from the user device. The program code may also include code to store the segmented chunks of the recording to storage as the segmented chunks are received. The program code may also include code to generate a partial transcript of the recording or update an existing partial transcript as segmented chunks are received. The program code may also include code to receive a publication request for a complete video file from the user device at a publication request time. The program code may also include code to generate a complete transcript for the complete video file of the recording from the partial transcript and a manifest of the complete video file. Finally, the program code may also include code to provide access to the complete transcript for the complete video file to one or more viewers within an instant timeframe from the publication request time, where the instant timeframe may be of constant order, independent of a length of the complete video file, and on an order of seconds.

In one embodiment, the instant timeframe may be a time to upload a remaining number of bytes to the server device from the publication request time, plus a time to complete processing the remaining number of bytes to generate the complete video file, plus a time to update the manifest for the remaining number of bytes.

In one embodiment, the non-transitory storage medium further may include program code to update the manifest of the recording as the segmented chunks of the recording are received by the server device at the discrete time intervals, by appending an identifier for each segmented chunk to the manifest.

In one embodiment, the non-transitory storage medium may further include program code to provide the partial transcript for display at the user device as the segmented chunks are received.

In one embodiment, the program code to update the partial transcript of the recording may be executed in response to a transcribed event, where the transcribed event may be generated for a transcription of a pending completed group, and where a given completed group may include a plurality of ordered, consecutive segmented chunks.

In one embodiment, the non-transitory storage medium further may include program code to determine a group duration based on one or more artificial intelligence (AI) model metrics of a multi-task multilingual automatic speech recognition (ASR) web service stream processor comprising an AI model, and determine a size of the given completed group based on a chunk duration and the group duration.

In one embodiment, the one or more AI model metrics may include a minimal accuracy window, where the minimal accuracy window is based on a word error rate (WER) of the AI model and an objective maximum word error rate.

In one embodiment, the non-transitory storage medium may further include program code to determine whether a completed group immediately prior to the pending completed group is successfully transcribed. In response to determining whether the completed group immediately prior to the pending completed group is successfully transcribed, the non-transitory storage medium may further include program code to initiate a transcription operation on the pending completed group by sending the pending completed group to an automatic speech recognition (ASR) webservice stream processor with a prompt, where the prompt may instruct the ASR webservice stream processor to transcribe the pending completed group, and where the prompt may include a transcription of the completed group immediate prior to the pending completed group. The non-transitory storage medium may further include program code to post the transcript of the pending completed group to a temporary storage as soon as it is output by the ASR webservice stream processor, and send the transcribed event indicating the transcription of the pending completed group to an event stream processor.

In one embodiment, a time-out window may be reset at the discrete time intervals, where an error is declared if the time-out window exceeds a predetermined delay.

In one embodiment, the non-transitory storage medium may further include program code to execute a hash function on an identifier of the media stream object to identify a transcription thread dedicated to the media stream object.

In one embodiment, the program code to store the segmented chunks of the recording to storage may include program code to receive a given segmented chunk through an upload proxy, and signal a stream processing platform of an upload event, in response to storing the given segmented chunk received through the upload proxy.

In one embodiment, the program code to update the partial transcript of the recording may further include program code to update the partial transcript with a timestamp based on voice-detected pauses in speech.

In one embodiment, the non-transitory storage medium may further include program code to generate, using an artificial intelligence algorithm, a suggested title for the complete video file from the complete transcript.

In one embodiment, the non-transitory storage medium may further include program code to generate the complete video file from the segmented chunks and the manifest, in response to receiving the publication request, and provide access to the complete video file and the complete transcript to the one or more viewers within the instant timeframe from the publication request time.

According to a second aspect, various non-transitory storage media for instantaneous media stream transcription are within the scope of the present invention. In one embodiment, a non-transitory physical storage medium storing program code is disclosed. The program code may be executable by a processor to cause the processor to execute a computer-implemented process for instantaneous media stream transcription.

The program code may include code to establish a communication channel between a user device and a server device. The program code may include code to receive by the server device, through the communication channel from the user device, a media stream object containing a recording initiated on the user device, where the recording may be received in segmented chunks at discrete time intervals from the user device. The program code may also include code to store the segmented chunks of the recording to storage as the segmented chunks are received. The program code may also include code to update a manifest of the recording as the segmented chunks of the recording are received by the server device at the discrete time intervals, by appending an identifier for each segmented chunk to the manifest. The program code may also include code to generate a transcribed event for a transcription of a pending completed group which comprises a plurality of ordered, consecutive segmented chunks, where a pending completed group size may be determined based on a minimal accuracy window metric of a multi-task multilingual automatic speech recognition (ASR) web service stream processor comprising an AI model. The program code may also include code to generate a partial transcript of the recording or update an existing partial transcript as segmented chunks are received in response to the transcribed event. Finally, the program code may also include code to display the partial transcript at the user device as the segmented chunks are received.

In one embodiment, the program code may include code to receive a publication request for a complete video file of the recording from the user device at a publication request time. The program code may also include code to generate a complete transcript from the manifest and the partial transcript for the complete video file. In addition, the program code may also include code to provide access to the complete transcript for the complete video file to one or more viewers within an instant timeframe from the publication request time, where the instant timeframe may be of constant order, independent of a length of the complete video file, and on an order of seconds.

The various features described above with respect to the system apply analogously to the non-transitory storage medium.

According to a third aspect, various methods, processes, and algorithms for instantaneous media stream transcription are within the scope of the present invention. In one embodiment, a computer-implemented method for instantaneous media stream transcription is disclosed. The method may include establishing a communication channel between a user device and a server device. The method may include receiving by the server device, through the communication channel from the user device, a media stream object containing a recording initiated on the user device, where the recording may be received in segmented chunks at discrete time intervals from the user device. The method may also include storing the segmented chunks of the recording to storage as the segmented chunks are received. The method may also include generating a partial transcript of the recording or updating the partial transcript of the recording as segmented chunks are received. The method may also include receiving a publication request for a complete video file of the recording from the user device at a publication request time. The method may also include generating a complete transcript from a manifest and the partial transcript for the complete video file. Finally, the method may also include providing access to the complete video file and the complete transcript to one or more viewers within an instant timeframe from the publication request time, where the instant timeframe may be of constant order, independent of a length of the complete video file, and on an order of seconds.

In one embodiment, the instant timeframe may be a time to upload a remaining number of bytes to the server device from the publication request time, plus a time to complete processing the remaining number of bytes to generate the complete video file, plus a time to update the manifest for the remaining number of bytes, where the instant timeframe may further include a transcription delay for one or more segmented chunks.

In one embodiment, updating the partial transcript of the recording may be executed in response to a transcribed event, where the transcribed event may be generated for a transcription of a pending completed group, and where a given completed group may include a plurality of ordered, consecutive segmented chunks. The method may further include determining a group duration based on one or more AI model metrics of a multi-task multilingual automatic speech recognition (ASR) web service stream processor, and determining a size of the given completed group based on a chunk duration and the group duration.

In one embodiment, the method may include providing the partial transcript for display at the user device as the segmented chunks are received.

The various features described above with respect to the system and the non-transitory storage medium apply analogously to the method.

In various embodiments, a computer program product is disclosed. The computer program may be used for instantaneous media stream transcription, and may include a computer-readable storage medium having program instructions, or program code, embodied therewith, the program instructions executable by a processor to cause the processor to perform the aforementioned steps.

In various further embodiments, a system is described, including a memory that stores computer-executable components, and a hardware processor, operably coupled to the memory, that executes the computer-executable components stored in the memory, where the computer-executable components may include components communicatively coupled with the processor that execute the aforementioned steps.

In other embodiments, the present invention is a non-transitory, computer-readable storage medium storing executable instructions, which when executed by a processor, causes the processor to perform a process for instantaneous media stream transcription, the instructions causing the processor to perform the aforementioned steps.

In another embodiment, the present invention is a computerized server including at least one processor, one memory, and a plurality of program code embodied on said memory, said plurality of program code, when executed, causing said processor to execute a process including the aforementioned steps. In yet another embodiment, the present invention is a computerized client including at least one processor, one memory, and a plurality of program code embodied on said memory, said plurality of program code, when executed, causing said processor to execute a process including the aforementioned steps. Other embodiments of the present invention include a system comprising a server device, a client device, and a communication channel between the server device and the client device. The server device and the client device may each include at least one processor, one memory, and a plurality of program code embodied on said memory, said plurality of computer codes, when executed, causing said processor(s) to execute a process including the aforementioned steps.

Other aspects and embodiments of the present invention include the methods, processes, and algorithms including the steps described herein, and also include the processes and modes of operation of the systems and servers described herein.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory storage medium may have corresponding features definable and/or combinable with respect to the server device and/or the user device and/or the system and/or the method, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Nor are all drawings corresponding to specific steps or embodiments of the present invention drawn to scale. Emphasis is instead placed on illustrating the nature, function, and product of the methods and devices described herein.

Embodiments of the present invention described herein are exemplary and not restrictive. Embodiments will now be described, by way of examples, with reference to the accompanying drawings, in which:

FIG. 5 illustrates a graphical user interface showing instantaneous media stream transcription, in accordance with an exemplary embodiment of the present invention.

FIG. 11 illustrates a flowchart for instantaneous media stream transcription, in accordance with an exemplary embodiment of the present invention.

FIG. 12 illustrates a flowchart for instantaneous media stream transcription, in accordance with another exemplary embodiment of the present invention.

FIG. 16 is a flowchart illustrating a process for instantaneous asynchronous media sharing, according to one embodiment of the present invention.

DETAILED DESCRIPTION OF THE INVENTION

In the following description, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Introduction

Conventional transcription services typically require dedicated high-performance servers, scalable storage, and a robust networking infrastructure enabling the streaming of customer audio directly to the servers where the transcription process is carried out.

Alternatively, a WebSocket-based approach for video transcription may involve streaming the video from the client to the server, processing the audio component of the video at the server, and sending the transcribed text back to the client through the same WebSocket connection.

To build a real-time or instant transcription solution, both the dedicated server and the WebSocket-based approaches are hard to scale due to server and networking resource consumption, server limitations, etc.

In addition to their latency and resource intensity, alternative incremental transcription solutions, such as batch transcription, typically suffer from context loss, leading to inaccurate, inconsistent, and ultimately lower-quality results.

Figure 7:
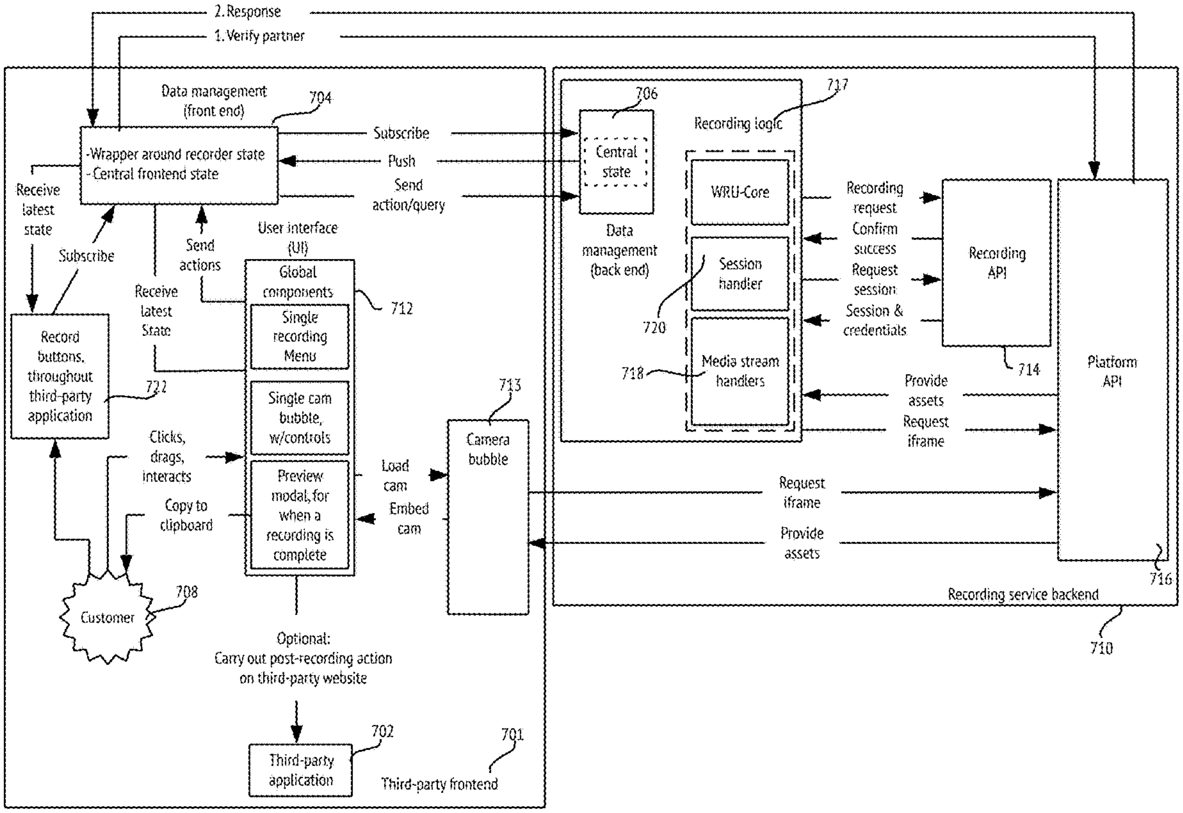
FIG. 7 depicts an illustrative system architecture diagram for video recording from a third-party website viewed on a user device, in accordance with an exemplary embodiment of the present invention.
Figure 8:
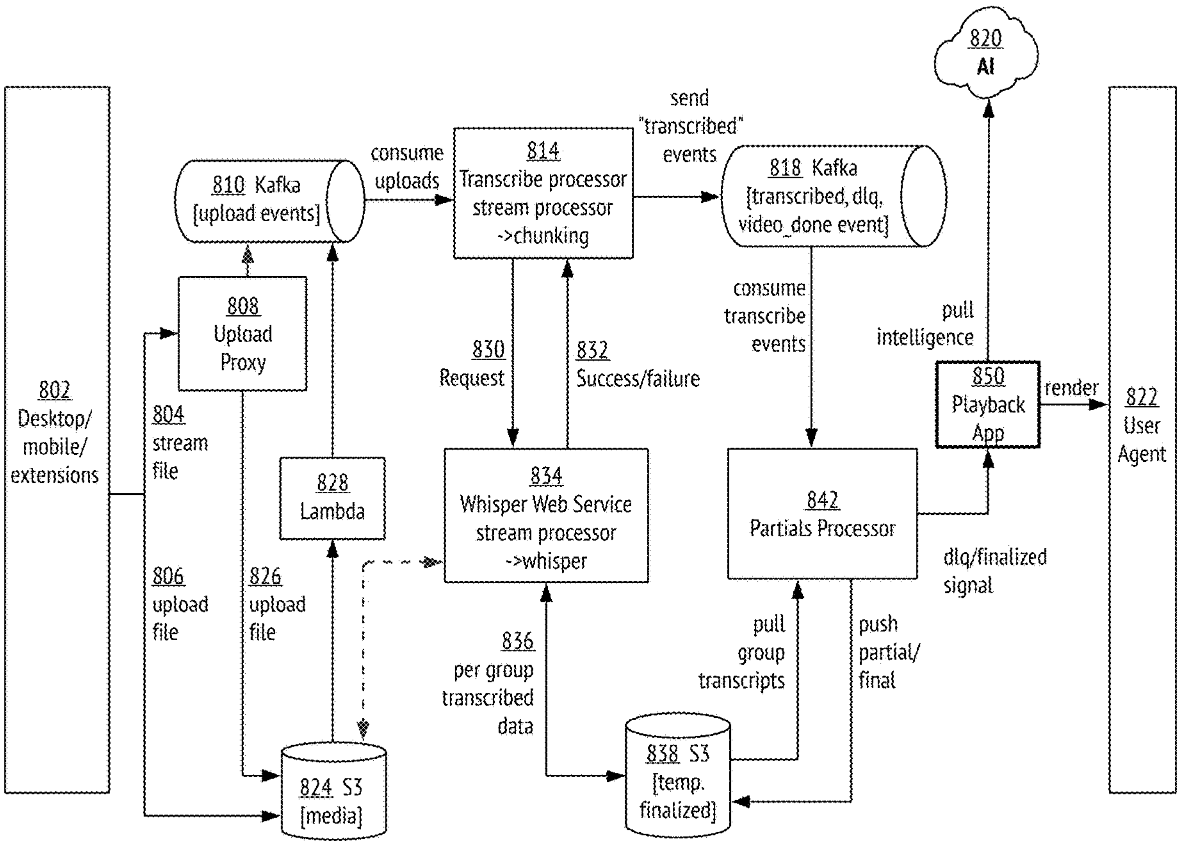
FIG. 8 shows an illustrative architecture diagram of an exemplary system for implementing instantaneous media stream transcription, according to one embodiment of the present invention.

With a live feed of video and audio emanating from customer-based recorders, the ideal solution would use the received audio feed scalably, without adding bandwidth demands on the customer side. It would also require no modifications to existing recording client software, ensuring even old versions of client recorders would benefit from instant/instantaneous transcriptions transparently. The detailed descriptions below, particularly the descriptions of FIGS. 7 and 8, provide a process that accomplishes such an instantaneous transcription solution.

Web-Hosted Video Recording

Figure 1:
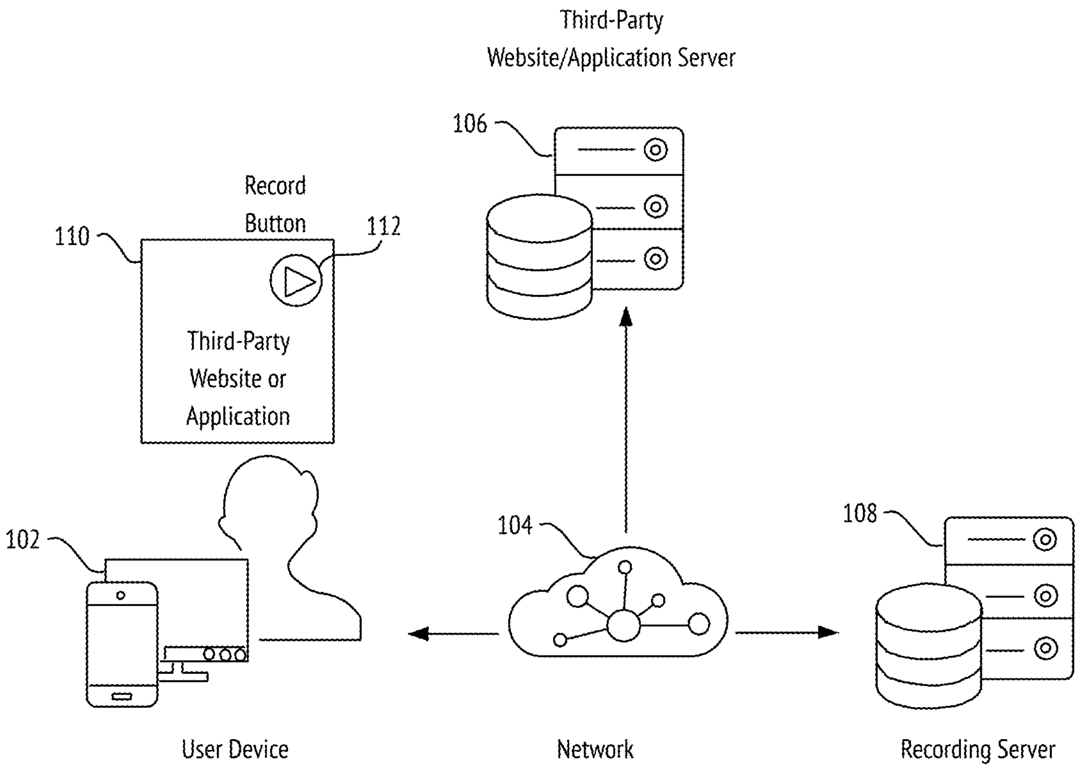
FIG. 1 illustrates a block diagram of a system for video recording from a third-party website on a user device, in accordance with an exemplary embodiment of the present invention.

FIG. 1 illustrates a block diagram of a system for loginless video recording from a third-party website or application (110) viewed on a user device (102), according to an exemplary embodiment of the present invention. The system includes the user device (102), the third-party website or application (110), a third-party website/application server (106), and a recording server (108). A user is enabled to access the third-party website/application (110) using the user device (102) via a network (104) such as the Internet, where the third-party website (110) offers the user the ability to record video, audio, and/or multimedia, usually as part of the service provided by the third-party website/application. The user device (102) is at least one of, but not limited to, the following: a smart phone, a camera, a tablet, a laptop, a personal digital assistant (PDA), and a desktop. For simplicity, the third-party website or application (110) is hereinafter referred to as the third-party website, and the third-party website/application server (106) is hereinafter referred to as the third-party server.

The third-party website (110) includes a recording interface such as a record button (112), or a “start recording session” button, where recording operations are provided by the recording server (108) through an iframe. The record button (112) enables the user to record video, audio, and multimedia inside the third-party website (110) without installing any recording software or logging into the recording service provided by the recording server (108) on the third-party website (110). Furthermore, the third-party website (110) may enable the user to share the recording (e.g., a recorded video) with other users on the third-party website (110). Loginlessness and anonymity are discussed in the section below titled “Web-Hosted Third-Party Services.”

The third-party website or application is any website or application providing a service to the user. In various embodiments, the third-party website or application (110) is any website or application providing telepresence capabilities to the user. In an exemplary embodiment, the third-party website (110) can be a fitness website, an educational website, a workplace website, or any other website providing an interactive or an individual service to the user. For example, the third-party website (110) may be a fitness website allowing the recording and sharing of workout routine videos between trainers and clients. In another embodiment, the third-party website is an educational website allowing loginless and anonymous video-, audio-, image-, or text-based interaction between students and teachers. In another embodiment, the third-party website (110) is a health services website providing interactions between medical professionals and patients. In some embodiments, the third-party website is a website allowing video messaging (e.g., video explanations of screen content/actions, video feedback) between customers and providers in any area of retail, medicine, technology, research, education, and industry.

In some embodiments, the third-party website/application (110) allows an experience or a process from within the website/application to be recorded and transmitted (e.g., via a video file or a link thereto) to any public inside or outside of the third-party website user base. In some embodiments, the third-party website (110) may set limitations on the sharing of the video recording and/or link.

In one embodiment, the network (104) may be the Internet or any wide-area, metro-area, or local-area network. In some embodiments, the network may include wireless communication links, such as shortwave, microwave, high frequency, wireless fidelity (Wi-Fi), Bluetooth technology, global system for mobile communications (GSM), code division multiple access (CDMA), second-generation (2G), third-generation (3G), fourth-generation (4G), 4G long term evolution (LTE), LTE Advanced, and any other wireless communication technology or standard to establish wireless communication for exchanging data.

Some embodiments of the present invention leverage a recording software development kit (SDK) provided to the third-party website (110) by the operator of the recording server (108), as discussed in the context of FIG. 7.

Web-Hosted Third-Party Services

The methods and systems described herein relate to providing a web-hosted recording service through a third-party website (i.e., a website that is not run by the recording server). The third-party website offers a recording service on one of its webpages (hereinafter the third-party webpage) and is hosted by a third-party server run by a third-party entity (e.g., application provider, service provider, content provider, etc.). The third-party entity hence provides access to a web-based service (e.g., video sharing, remote education, telepresence, telemedicine, etc.) for its users, through a network browser or a third-party application already installed on the user device.

In various embodiments of the present invention, the user is a subscriber of the third-party service, hence is known to the third-party entity (e.g., a member of the third-party user or client base, with a user record in a third-party user database). In various embodiments, the third-party entity is a partner of the recording service provider running the recording server. The recording service provider may be referred to herein as the operator of the recording server. For example, the recording service provider may provide recording services to members or visitors of the third-party website. Consequently, the third-party webpage, website, and server may be equivalently referred to as the partner webpage, website, and server respectively, since the third-party entity usually needs to be an established partner of the recording service provider in order to obtain recording services for its users.

Although the terms “recording services” and “video recording services” are used interchangeably herein, the methods described herein apply to any digital recording service offered through a server over a network for hosting and sharing purposes, including but not limited to video, audio, image, media, and multimedia recording. The video recording service is hence accessible via a third-party website, to be viewed by a user on a user device.

In one embodiment, the system provides loginless video recording from a third-party website or application (110) viewed on a user device. Loginlessness is defined herein as the absence of a requirement for the user to provide login information to a server in exchange for using a web-hosted service. Furthermore, anonymity is defined herein as the absence of a user-identity record incurred as a result of a web-hosted service, where a user-identity record is a user-identifying piece of data. Anonymity is thus defined as the absence of such a user-identity record at any relevant network entity, such as a server or an intermediate network node (e.g., router).

Crucially, in relation to the methods and systems described herein, although the user may be known to the third-party entity, the user need not be a subscriber of the recording service. The recording service is therefore loginless in that it is provided to visitors (e.g., users) of the third-party website without any need for them to provide login credentials to the recording server. The recording service is also anonymous with respect to the recording service provider in that the recording server receives no user-identifying record. FIGS. 7 and 11 describe embodiments enabling loginlessness and anonymity with respect to the recording server.

Loginlessness and anonymity as defined herein hence strictly apply from the perspective of the recording service provider rather than from the perspective of the third-party entity. Nevertheless, the methods described herein are required to enable absolute loginlessness (i.e., absence of any login action by the user at the third-party and recording servers) and absolute anonymity (i.e., absence of any user-identifying record at any of the network entities involved, including the third-party and recording servers). While absolute loginlessness is currently in use worldwide (e.g., the use of YouTube without logging in), absolute anonymity may require steps by the third-party server in addition to the ones described in FIGS. 7 and 11.

Commercial anonymity is an intermediate level of anonymity defined herein as the absence of a user-identifying record at any of the network entities involved, except for the third-party server. Commercial anonymity clearly has tremendous commercial value, as it allows trusted third-party entities to provide anonymous recording services, or to add anonymous recording services to their existing service offerings, for their verified subscribers. So-called commercial anonymity also has practical value, as it can augment an existing web-based service using readily available website security and privacy measures. The methods described herein, particularly the embodiments described in FIGS. 7 and 11 enable commercial anonymity.

Illustrative Example of a Web-Hosted Recording Service

Figure 2:
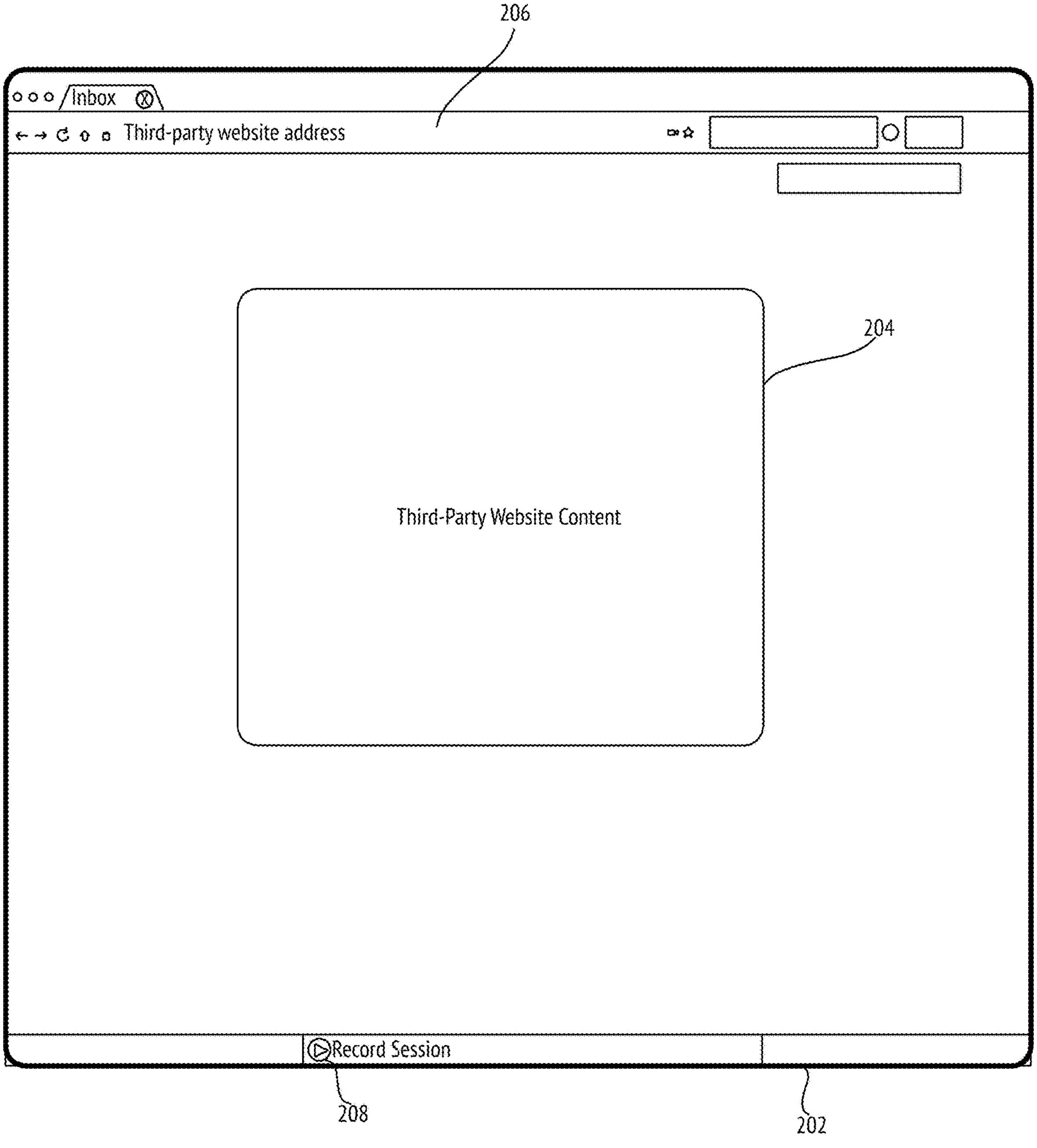
FIG. 2 shows a graphical user interface for video recording on the third-party website, depicting means for a user to start a recording session, in accordance with an exemplary embodiment of the present invention.

FIG. 2 shows a graphical user interface for video recording on the third-party website, depicting means for a user to start a recording session, in accordance with an exemplary embodiment of the present invention. The third-party server is configured to transmit the third-party website content (204) (e.g., an HTML page) to the user device for display, in response to receiving a user access request to access the third-party website address (206). The third-party website content (204) is displayed on a browser (202) of the user device. The third-party website content (204) may include a record session button (208) to initiate a recording of a video. Exemplary browsers (202) include Internet Explorer, Firefox, Google Chrome, Safari, and Opera.

Figure 3:
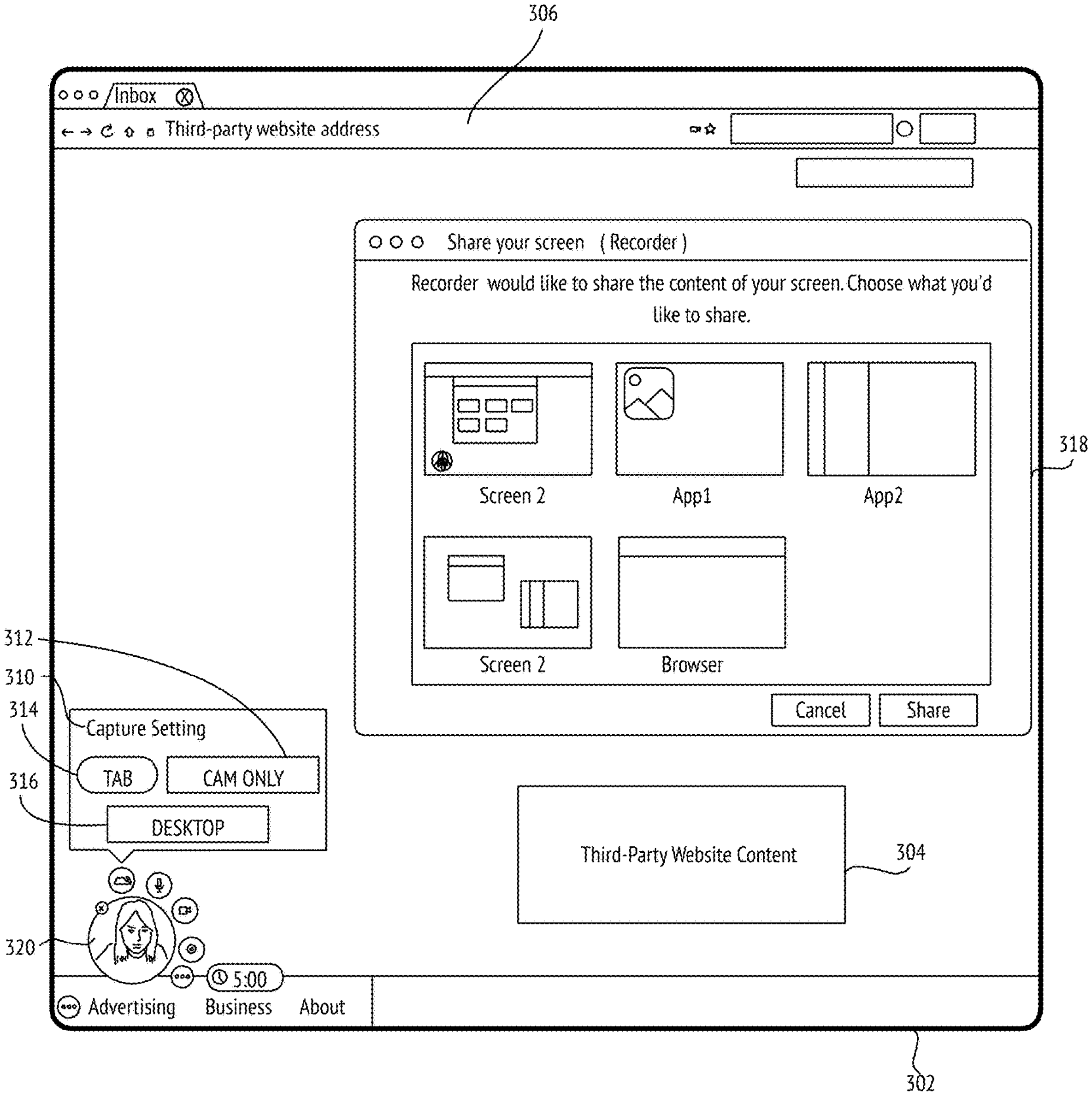
FIG. 3 depicts a graphical user interface for video recording on the third-party website, depicting capture setting selection, in accordance with an exemplary embodiment of the present invention.

FIG. 3 depicts a graphical user interface for video recording on the third-party website, depicting capture setting selection, in accordance with an exemplary embodiment of the present invention. FIG. 3 shows the browser (302) after the user enters the third-party website address (306) and clicks on the recording interface button (208). The video recording server is configured to transmit an embedded recording interface to the third-party website on the user device, in response to the user requesting a recording session. In some embodiments, once the user clicks on the record session button, the third-party website transmits an iframe request to the video recording server, where the iframe provides the video recorder interface on the third-party website. In one embodiment, the video recording server is configured to transmit iframe content to the user device, in response to the iframe request. The browser (302) on the user device displays the video recorder interface as part of the third-party website content (304). In some embodiments, the video recorder interface includes a capture setting box (310). The capture setting box (310) has one or more buttons providing one or more corresponding controls for the user to select what the user wants to record. The one or more buttons may include a tab (314) control enabling the expansion or collapse of the capture setting box (310), a cam only (312) control limiting the recording to one of the user device cameras, and a desktop (316) control enabling the recording of one or more screens or windows of the user device display. In one embodiment, a screen and window selection (318) window is also displayed when a recording session is requested by the user. The screen and window selection (318) enables the user to select which part of the desktop to record. In some embodiments, the user may select any of the active screens or windows displayed at the user device, where each active window is associated with an application running on the user device. Further, the video recorder interface includes a camera bubble (320) providing at least one or more recording controls to the user (see FIG. 4).

Figure 4:
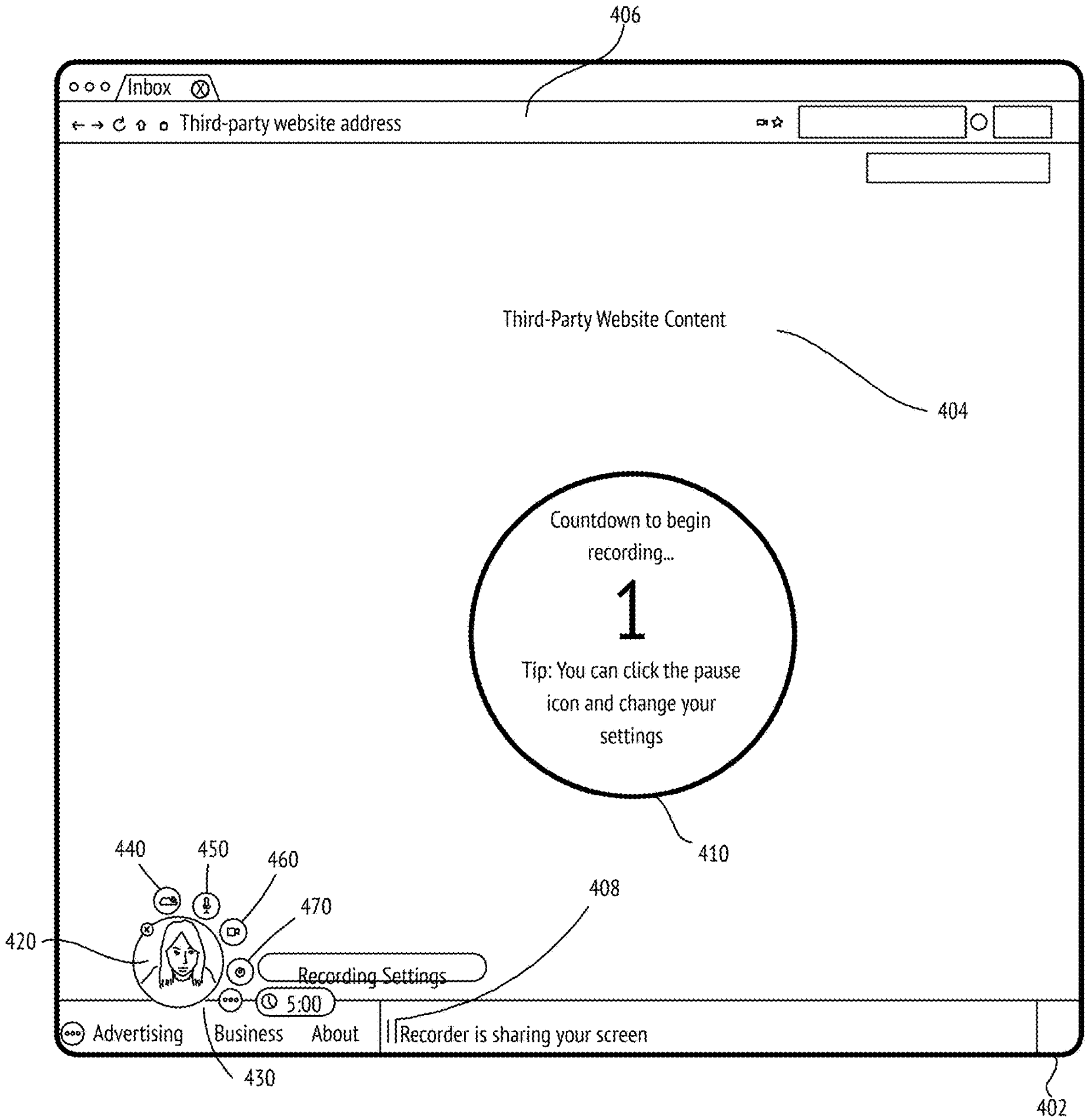
FIG. 4 illustrates a graphical user interface for video recording on the third-party website, depicting a camera bubble, in accordance with an exemplary embodiment of the present invention.

FIG. 4 shows a graphical user interface for video recording on the third-party website, depicting a camera bubble (420), in accordance with an exemplary embodiment of the present invention. FIG. 4 shows the browser (402) after the user enters the third-party website address (406), clicks on the recording session button (208), and uses the capture settings box (310) to select the screen or window (318) to be recorded. In one embodiment, the camera bubble (420) appears embedded within the third-party website content (404) on the browser (402) of the user device. The camera bubble (420) displays a view of the user video (430) as generated by a selected camera. In addition, the camera bubble (420) provides a set of recording controls to the user, such as a video record/stop button (470), a camera on/off button (460), a microphone on/off button (450), or a menu button (440) providing access to further functions and settings. FIG. 4 also shows a recorder settings button next to the record/stop button (470), providing access to recording settings such as camera selection.

In one embodiment, a countdown interface (410) appears in response to the user clicking on the record button (470), providing a countdown to the start of the video recording. The countdown interface (410) may include controls enabling pausing of the recording. The third-party website content (404) may replace the record session button (208) with another pause button (408) for the duration of the recording session, including the countdown. The recording session enables the user to perform recording actions such as starting, stopping, previewing, editing, and canceling a video recording. The user may also be enabled to delete, preview, edit, and post the recorded video to the third-party website. All such actions may be enabled without requiring the user to log into the video playback application or the video recording server.

In one embodiment, the user of the third-party website is enabled to exchange video messages with other users of the third-party website. The user is enabled to record and share any media or content (e.g., screen, video, audio, images, text, etc.) that are allowed to be recorded by the third-party website on the user device.

Exemplary Instantaneous Transcription Graphical User Interface

FIG. 5 illustrates a graphical user interface showing instantaneous media stream transcription, in accordance with an exemplary embodiment of the present invention. FIG. 5 shows a transcription window after the user initiates a video. In one embodiment, the transcription window may include a camera window (502) with camera controls (504), a comment section (506), and an engagement menu (508). In one embodiment, a top menu (510) may include an user account menu (512), a video sharing button (514), and a title customization variable menu (516). In one embodiment, the AI-enabled features may include an AI-generated summary (520), and AI-generated title (i.e., auto-title) (522), and an instant transcript panel (530) accessible through an application menu (540). In one embodiment, the instantaneous transcription panel may include an instantaneous transcription menu (532) enabling transcription-specific operations such as searching, copying, correcting and/or downloading transcript text. In one embodiment, the transcript is divided into consecutive sections (534) that may be individually selected. In one embodiment, each consecutive transcript section (534) may have a starting timestamp and a copy button. In one embodiment, each consecutive transcript section (534) may appear as the recording progresses. In another embodiment, the consecutive transcript sections (534) may appear instantly upon completion of the recording by the user.

Notional Instant Transcript Waiting Time

Figure 6:
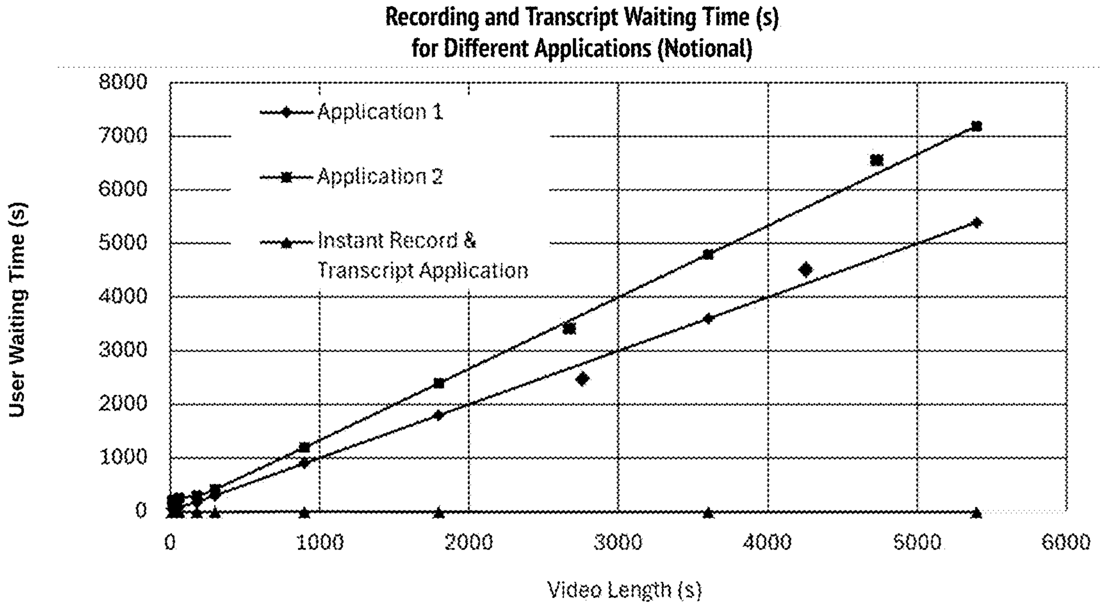
FIG. 6 shows a notional plot illustrating transcript waiting time for different applications, in accordance with an exemplary embodiment of the present invention.

FIG. 6 shows a notional plot illustrating transcript waiting time for one instantaneous or instant transcription application and two conventional media streaming transcription-enabled applications, in accordance with an exemplary embodiment of the present invention. Specifically, FIG. 6 shows the expected recording and transcript waiting times from the moment a recording of a streaming media session is terminated by a user to the moment both a recording and a transcript of the media session are available to the user.

In the instant record & transcript application case, since the transcript is continuously being updated in the server as the media is streaming, the time taken from the publication request time at which a user request for a complete video of the session is input by a user through the user device, to the time when the recording and transcript become available for consumption, is very short compared to many other existing technologies, as shown in FIG. 6. This is because the turn-around time is simply the time needed to upload a remaining number of bytes to the server from the publication request time, plus a time to complete the post-processing pipeline on the remaining number of bytes at the server from the time at which streaming or upload ends. In some embodiments, this turn-around time may further include a residual transcription delay for one or more segmented audio chunks. In various embodiments, this turn-around time may be in the order of a few seconds for any media file, irrespective of the file's length. Thus, the user may experience an "instant" or "instantaneous" rendering of both the recording and the transcript, which is highly desirable for improved user experience.

Therefore, in the case of the instantaneous transcription application, the transcript is carefully extracted, with attention to context, accuracy, and sentence continuity, all while the recording is in session. The end result is to have the transcript ready for consumption almost immediately upon media creation (i.e., recording availability). Such instant gratifications and ease of use may further promote and encourage users to create a larger number of longer media files (i.e., video, audio, animation, etc.).

Accordingly, an instant recording and transcription media streaming application is compared with existing transcription-enabled media streaming applications in FIG. 6. The comparison is carried out in terms of the expected time it takes for a complete transcript to become available for display and download, upon completion of a video recording process, where the recorded videos may be of various lengths. The time delay between the termination of a video recording process and the time at which the corresponding completed recording and transcript become available for display and/or download is defined as the record & transcript waiting time. FIG. 6 shows that while the expected record & transcript waiting time remains in the order of seconds for the instant record & transcript application, regardless of the length of the streaming media session, the expected record & transcript waiting time for conventional applications may grow linearly or exponentially with the size of the streaming media file (e.g., the recorded video file).

Irrespective of the media length, the total waiting time may therefore include a recording waiting time and a residual transcription waiting time that is observed beyond the recording waiting time. The average residual transcription time is expected to be below the transcription time of a single group. For a group size of five chunks, for example, the average residual transcription time is expected to be around two seconds.

Note that transcript waiting times for the instantaneous transcription application may contain jitters instead of being a smooth linear curve, since it is expected that internal processing of larger video chunk sizes, combined with fluctuations in group transcription times, may have an impact on the waiting time, in the scale of seconds.

Instantaneous transcription is expected to be much faster than other applications, where the recording user needs only wait for a few seconds after a recording is finished, until the transcript becomes available, as compared to expected waiting times that are at best in the order of minutes as media file lengths become more than 15 minutes. The superior results of instantaneous transcription can be explained by the fact that recording and transcript processing are continually being performed as the media stream is uploaded, and the waiting time is only the time to upload and process a remaining portion at the end of the media file, after the recording process terminates.

Architecture and Process for Web-Hosted Video Recording

FIG. 7 depicts an illustrative system architecture diagram for loginless video recording from a third-party website viewed on a user device, in accordance with an exemplary embodiment of the present invention. At the third-party frontend (701), the system architecture includes the third-party application (702), the data management frontend (704), the customer (e.g., playback app user) (708), the video recording user interface (UI) (712), and the camera bubble logic (713). On the recording service backend (710), the system architecture includes the data management backend (706), the recording logic (717), the recording API (714), and the platform API (716).

The third-party website/application has a video recording UI that allows the user to record the video through the user device. The video recording UI (712) includes recorder menus/controls, including an interface for initiating a camera bubble, that allows the user to record and/or edit a video. The camera bubble logic (713) generates a camera bubble that pops up on the user device (e.g., within the third-party website or application) when the user gives the camera permission on the user device and starts a recording session. A record button (722) is provided on the third-party website or application. The camera bubble has various control buttons to control the recording of the video, as described in FIGS. 3 and 4. For example, a circular window on the user screen may show the camera output.

The data management frontend (704) communicates with the video recording API (716) to verify the identity of the third-party website. The data management backend (706) keeps track of recording state. The data management frontend (704) keeps recording state in sync with the data management backend (706). The central state at the data management backend (706) holds the true status of the recording session (e.g., whether the session has started, ended, has an error, is in the middle of uploading, etc.). The status on the third-party frontend (701) gets updated through push operations. Recorder "state" includes multiple parameters such as user account details (if the user is logged into the third-party website), the status of the video, video duration limit, recording limit (e.g., file size), and other parameters that control the look and feel of the recording menu. The data management frontend (704) and backend (706) provide the interface for the third-party application/website (702) and the video recording service backend (710) to communicate with each other. The video recording service backend (710) is configured to create one instance of recorder per video initialized. The recording logic (717) includes the recording core, a session handler (720), and media stream handlers (718).

The video recording service backend (710) is configured to receive the video and audio streams from the user device and store the recorded video and/or audio streams to generate a finalized video via the recording API (714). The platform API (716) is configured to provide core service components, such as iframe, and to validate the third-party website. The session handler (720) requests session credentials, manages storage bucket credentials (e.g., over Amazon S3), and requests sessions. The recording logic (717) is configured to manage the recording action requests (e.g., start/stop recording) from the third-party website or application on the user device.

As described in more detail in relation to FIG. 8, the instantaneous transcription process described herein has two major aspects, in one illustrative embodiment of the present invention:

1. A transcription state management that receives all transcription-related events and orchestrates calls to the transcription service. In one embodiment, transcription state management is implemented as part of the data management backend (706). In other embodiments, it may be implemented separately within the recording backend or as an independent service receiving recording data from the recording backend. In some embodiments, transcription state management is implemented as a pipeline in the FLINK network stack of AMAZON Web Services (AWS).

2. A transcription service that carries out the transcription based on calls from the transcription state management (e.g., FLINK pipeline). In some embodiments, the transcription service is implemented as a micro service deployment using the ELASTIC KUBERNETES Service on AMAZON Web Services (AWS).

Instantaneous Transcription Process

FIG. 8 shows an illustrative architecture diagram of an exemplary system for implementing instantaneous media stream transcription, according to one embodiment of the present invention.

A user front-end implemented on a user device 802 (e.g., a desktop, a mobile device, or a software extension) performs ongoing recording of media content, in chunks of a fixed time duration (e.g., up to 5 second segments). This media content is uploaded to a web-based storage service 824 (e.g., AMAZON simple storage service S3 provided by AMAZON Web Services (AWS)) via two separate routes.

In a first approach, a stream file 804 is streamed through an upload proxy 808 (e.g., a web socket-based server-side Golang service). Upload proxy 808 uploads file 826 onto a media bucket in 53 824, and generates an event for every chunk pushed to S3. That is, upload proxy 808 is a producer that initiates an event on an event storage and streaming platform 810 (e.g., KAFKA). When this producer produces to KAFKA, it may choose to make sure that the argument has persisted. Upload proxy 808 that pushed an upload event to KAFKA 810 may therefore require a KAFKA broker to return an acknowledge signal upon successful event creation on an upload-event topic.

In addition, once an object reaches S3 824, S3 also generates an event for the same chunk, but without duplication of the chunk in S3. That is, when upload proxy 808 fails, an upload file 806 pushed into S3 824 using an S3 accelerator (e.g., EDGE LOCATION, CLOUDFRONT services) still triggers an upload event into KAFKA 810. An event-driven, serverless compute service such as AWS Lambda service 828 is utilized to handle S3 event notifications from S3 bucket 824. The S3 bucket 824 creates objects internally and excites Lambda 828 to execute an upload-event creation to KAFKA 810.

Hence, this illustrative architecture double pushes events onto the KAFKA upload-event topic 710. For the same upload, upload proxy 808 pushes data into S3 824 as well as pushing an event to the KAFKA upload-event topic 810. Additionally, triggered by an event notification on S3 824 through Lambda 828, another event is created in KAFKA upload-events topic. That is, for a single particular upload or creation of an object within S3 bucket 824, two events are generated on KAFKA topic 810. This design provides a failover safety net as user device 802 does not always provide an invariant wherein the upload proxy always succeeds.

On the other hand, service-level agreements (SLA) on S3 event notifications may not cover end-to-end latency. As a result, if an object is dropped onto S3 bucket 824, it may take anywhere from a second to a minute before the event is actually executed through Lambda 828. In a case where every event on the proxy 808 fails, this setup shown in FIG. 8 introduces a non-first-in-first-out sequencing of events. That is, assuming chunks of the media content being uploaded are labeled as part1, part2, etc. in sequence, then part2's event may reach KAFKA before part1's event. This is because when upload proxy 808 uploads via S3 824, the desktop uploader may make multiple attempts and the first-in-first-out nature of the part file upload to S3 may not be adhered to when corresponding events are created on KAFKA.

KAFKA records events as key-value pairs in log files called partitions. A KAFKA topic is made up of partitions. In one example, a topic is composed of five different partitions, each on different brokers, or servers. KAFKA is a distributed parallel pub system. Each particular partition has replicas behind them in a master-slave architecture. When an event is pushed into KAFKA, it is only the leader that gets that particular event and the event is replicated over to the slaves. If the master fails, that implies generally that the broker fails as well, and a new leader election occurs, with a slave becoming the new master. In the context of the upload proxy 808 uploading to S3 824 for event creation on KAFKA 810, even though both upload proxy 808 and Lambda 828 have partition affinity, events may still be created out of order.

The upload shown in FIG. 8 decouples from at-least-once-delivered semantic, which is different from exactly-once-delivered semantic in the sense that duplication can actually happen. Thus, within this exemplary architecture, the system of receiving an event from the desktop is decoupled from downstream processing. Anything that happens on the downstream has no effect on the desktop, mobile, and extensions 802. The instantaneous transcription service would not bring down the front-end, as events are logged into KAFKA, data is stored in S3, and beyond an initial hand-shake, there are no additional requests made to the front-end.

Lambda 828 is a serverless, event-driven compute service that is triggered by S3 events to run specific user-provided code without requiring the user to provision or manage servers. Lambda 828 sits on top of S3 bucket 824, a recording media production bucket. Lambda 828 monitors object-created events from S3 824. For example, Lambda 828 may be triggered when a raw media upload to S3 occurs, or when a transcoded audio arrives. Within the recording system, such events are created with recording uploads and video trimmings and revisions. In some embodiments, Lambda 828 may perform functions similar to those by Upload Proxy 808. However, Lambda 828 does not require an acknowledgement from KAFKA. That is, Lambda 828 does not wait for the data to persist in a broker's drive; it moves media data from S3 onto KAFKA as fast as possible. Fault tolerance is achieved with high probability as there are two specific elements (e.g., 808 and 828) that create the same event for the same particular upload onto S3. Hence, fault tolerance may be provided using a combination of using local data (e.g., 808) and periodic checkpointing from S3 (e.g., 828). If the pipeline were to fail and restart, the latest successful checkpoint recreates the state for the pipeline. The generation of transcripts is thus idempotent, and replay of the state from history does not affect the final state. Note also that the publish-subscribe component of the KAFKA architecture has its own failover mechanisms.

Figure 9:
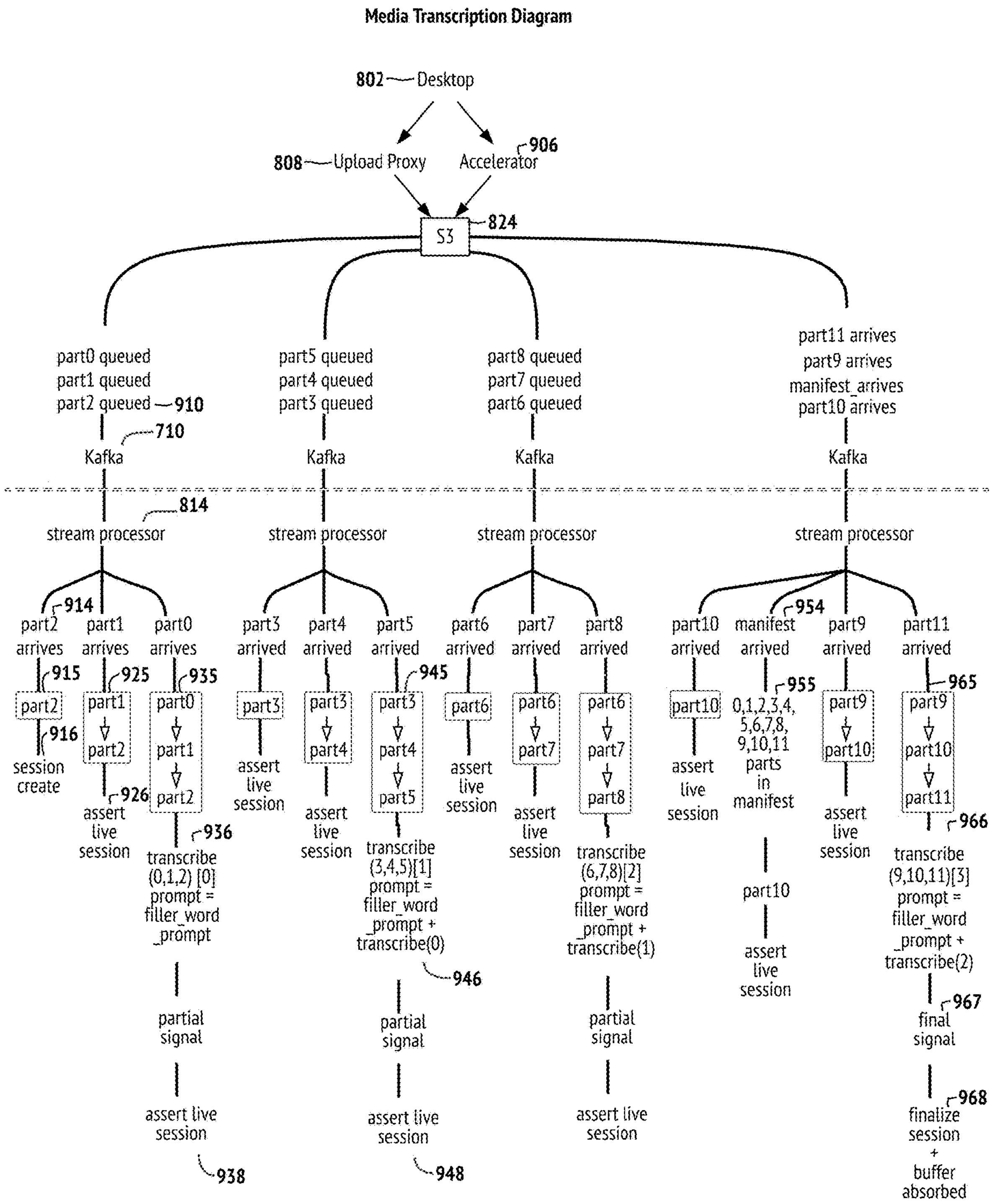
FIG. 9 shows an illustrative schematic diagram for instantaneous media stream transcription, according to one embodiment of the present invention.

Next, a transcribe processor 814 orchestrates the transcription of received chunks of data. Accordingly, FIG. 9 shows an illustrative schematic diagram for instantaneous media stream transcription, according to one embodiment of the present invention. As a recording starts on desktop 802, recorded chunks having fixed time durations are uploaded via upload proxy 808 and S3 accelerator 906 onto S3 bucket 824 and transcoded for audio. Such recorded chunks or parts are then queued into KAFKA 810. In this particular example, an audio part2 910 is first queued into KAFKA. KAFKA consumes uploads and the transcribe processor/stream processor 814 accepts a part2-arrives event 914. Stream processor 814 may be implemented as a chunk-grouping and state-management module (e.g., as a FLINK pipeline). It sets the state to part2 915, and creates a new session 916 for transcribing media into text. Next, part1 arrives, is concatenated with part2 (e.g., keys within S3 are put in order) into a set part1→part2 925 waiting for other parts to arrive. The arrival of part2 reasserts the live session window 926. In this particular example, transcription group size is set to 3. That is, stream processor 814 has been configured to group every 3 consecutive chunks together before requesting a stateless transcription service (i.e., the group size in this embodiment is 3).

A group may not be transcribed until all parts of the group have arrived. Furthermore, the media parts may arrive out of order as they may not follow first-in-first-out semantics. Finally part0 arrives, and the group 935 is ready to be finalized and transcribed. Note that group size may be determined based on different factors such as AI model specifications and capabilities. The group size of 3 shown in FIG. 9 is illustrative, and the methods disclosed herein are not limited to a group size of 3. The partial transcript for the group may be displayed at the user device as the segmented chunks are received and transcribed.

In some embodiments, an objective maximum word error rate (WER) may be set as a design objective. The objective maximum WER may be achieved by determining a minimal accuracy window of the AI model in use (e.g., WHISPER web service), where the minimal accuracy window denotes the input audio duration required to achieve the objective WER, according to the AI model's specifications. In one embodiment, the group size is determined to be the smallest group size that is larger than, or equal to, the minimal accuracy window. In some embodiments, AI model capabilities may allow for group sizes ranging from 1 to 10 chunks, where each chunk is a few seconds long. Depending on the chunk size, the group size may take any value from 1 to 10, where smaller group sizes provide improved transcription speed while being able to maintain the minimal accuracy window. (In some embodiments, the group size is 1. In some embodiments, the group size is 2. In some embodiments, the group size is 3. In some embodiments, the group size is 4. In some embodiments, the group size is 5. In some embodiments, the group size is 6. In some embodiments, the group size is 7. In some embodiments, the group size is 8. In some embodiments, the group size is 9. In some embodiments, the group size is 10. In yet other embodiments, the group size is greater than 10.)

An automatic speech recognition (ASR) web service stream processor (e.g., WHISPER) 834 in FIG. 8 may next be prompted with the references to the keys within S3 to part0, part1, and part2 of group0, plus a filler word prompt (e.g., "transcribe (0,1,2) [0]prompt=filler_word_prompt"). WHISPER is a general-purpose speech recognition model trained on a large dataset of diverse audio and the disclosure uses WHISPER as an example representing any ASR web service stream processor. It is a multitask model that can also perform multilingual speech recognition as well as speech translation, spoken language identification, and voice activity detection. Specifically, WHISPER deploys an encode-decode-type of architecture with self-intention. It can be prompted with specific requests, and its performance as measured using word error rates (WERs) or character error rates (CERs) vary depending on the language. Furthermore, WHISPER is trained on non-filler words. Note that the methods and systems described herein are not limited to the use of web services such as WHISPER, and any ASR machine learning model is within the scope of the current invention, as further discussed in the "Machine Learning (ML) and Neural Networks" section below.

Figure 17:
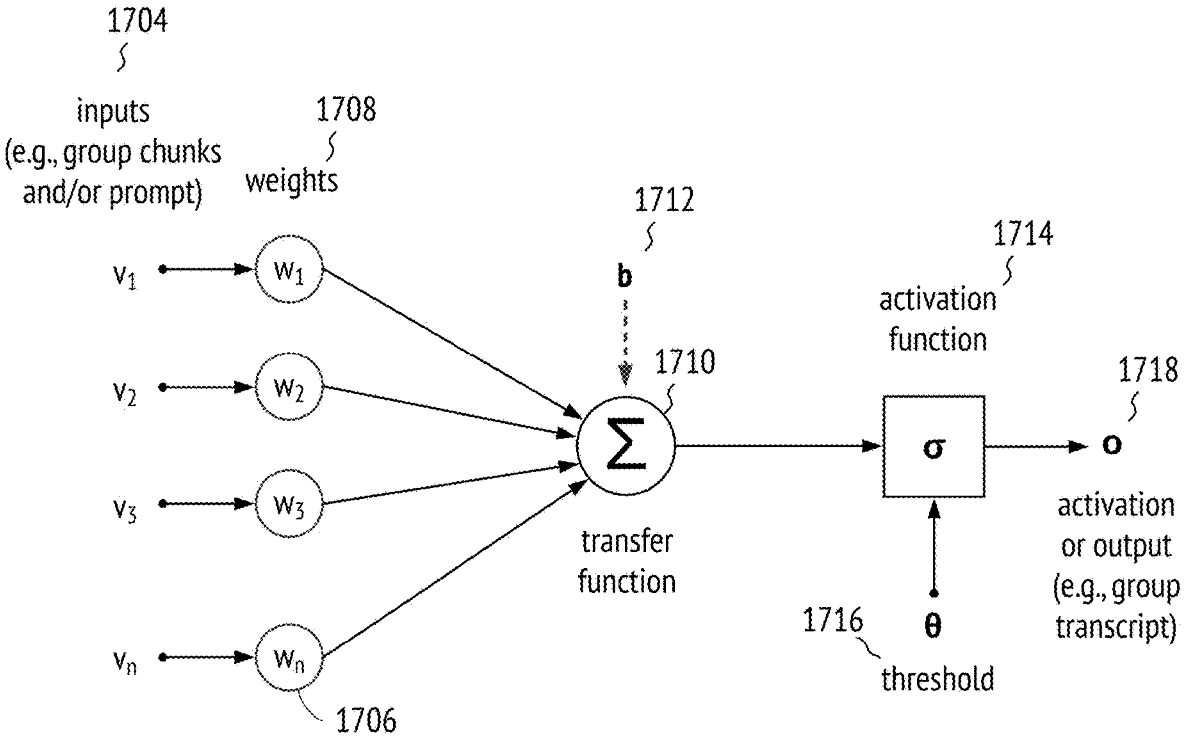
FIG. 17 describes fundamental neural network operation as it relates to instantaneous media stream transcription, according to exemplary embodiments of the present invention.
Figure 18:
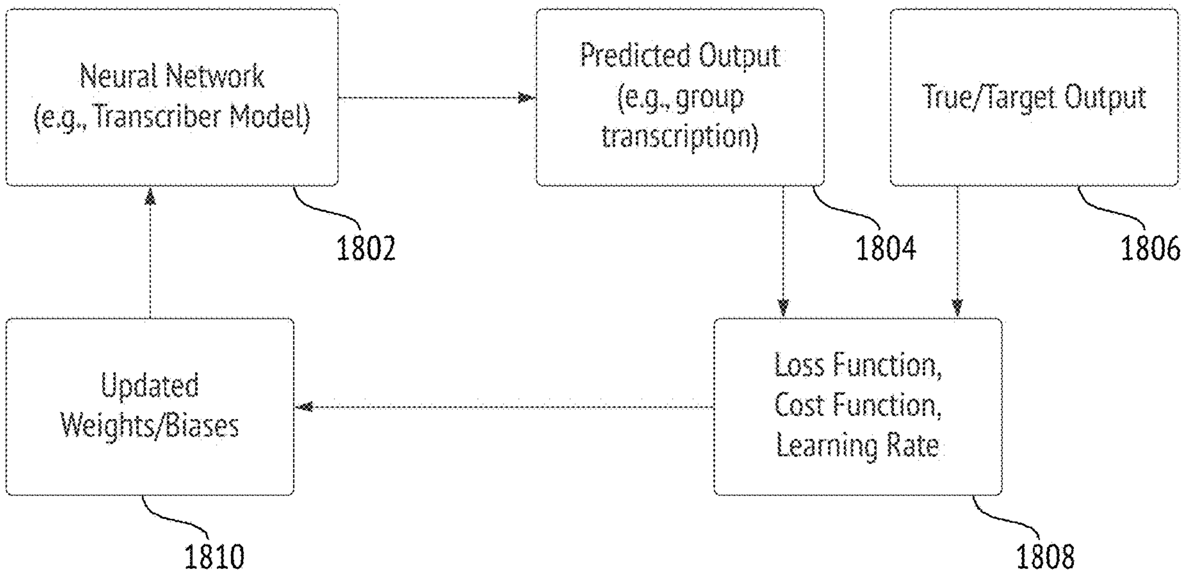
FIG. 18 shows an overview of the neural network training process that can be used for instantaneous media stream transcription, according to exemplary embodiments of the present invention.
Figure 19:
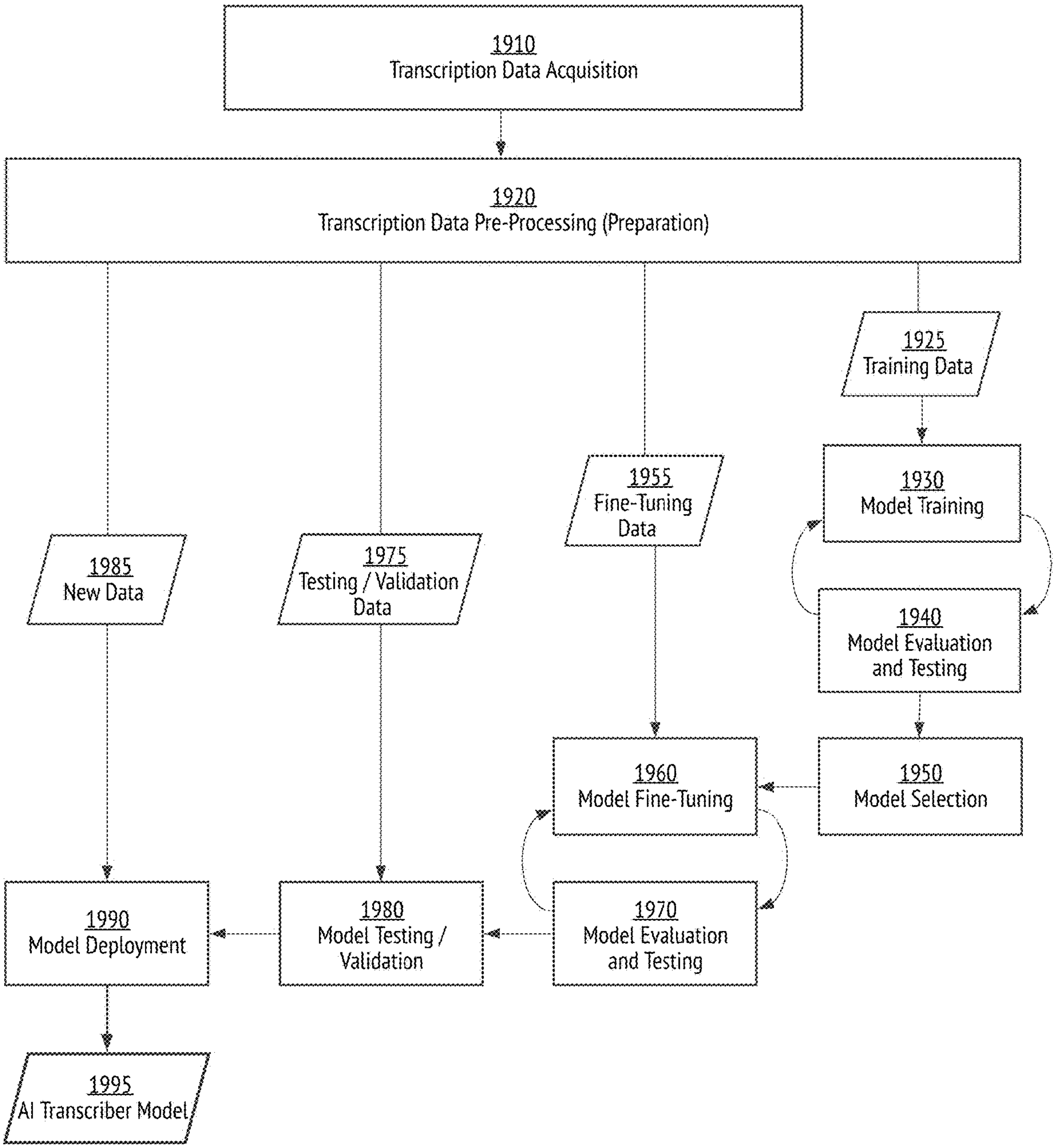
FIG. 19 is an illustrative flow diagram showing the different training phases and datasets involved in training a machine learning algorithm for instantaneous media stream transcription, according to exemplary embodiments of the present invention.

As human speeches often contain filler words, a filler_word_prompt may be provided to WHISPER to take into account filler words. For example, a prompt may be that "you are supposed to auto-transcribe this particular audio and you would see words like 'um,' 'ah,', 'eh,' and 'you know' that are to be removed." WHISPER can then be on the lookout for these particular fillers. (FIGS. 17-19 provide further details on training and deploying a machine learning model, in accordance with embodiments of the present invention.) The stream processor 814 again asserts the live session window 938. Every time there is an event occurring on behalf of a video ID, it is asserted as a live session.

Next, part3, part4, and part5 arrive for the same recording. They are concatenated into a group 945 and a transcription request (arrow 830 in FIG. 8) is sent by stream processor 814 to WHISPER web service 834, a with prompt "transcribe (3,4,5)[1]prompt=filler_word_prompt+transcribe(0)" 946. That is, the prompt contains not only the static filler_word_prompt, but also the transcription of group0 immediately prior to current group1. The purpose of feeding in the immediate prior group transcription is to maintain continuity by the encoder-decoder-based LLM model. Recall that chunking of the input video is by a prior determined time duration. Fixed-duration segments (e.g., 5-seconds long chunks) do not necessarily break on sentence boundaries or even word boundaries. Feeding the transcription of the previous group as part of the prompt for the next group ensures the LLM-based WHISPER web service 834 maintains contextual continuity or continuity of the transcribed sentence. Thus, a group of media parts cannot be transcribed until all the part files are received, and a subsequent group cannot be transcribed until the immediately prior group has been transcribed fully. The orchestrating transcribe processor 814 therefore needs to maintain a state for the transcription, as the process is not a one-to-one conversion of a standalone audio clip into a standalone message.

Similarly, as part6, part7, and part8 arrive, they are concatenated and transcribed, with a prompt to the WHISPER web service containing the transcription of the previous group of part3, part4, and part5.

The transcribe processor 814 includes the pipeline that manages state on behalf of recording. One of its functions is to call the transcription web service 834 to do a group transcribe. It usually succeeds and pushes 836 the transcription to S3 838, as discussed below. A success signal 832 is then transmitted from the transcription web service 834 to the transcribe processor 814. However, the transcription may fail for various reasons such as (1) unavailable chunk on S3, (2) S3 unavailable due to a transient issue, or (3) model unable to transcribe. A fail signal 832 is then transmitted from the transcription web service 834 to the transcribe processor 814. In some embodiments, the fail signal 832 includes data on the nature of the failure.

These signals 832 from the service are used to decide whether the request 830 should be retransmitted (e.g., if the source of failure is transient) or whether to suspend any transcription for the recording (e.g., a transcript is deemed unrecoverable). In one embodiment, if a transcript is unrecoverable, a signal is sent to the front end that this recording will not have a transcription and other transcription methods (e.g., conventional post-recording transcription) may need to be used.

Next, part10 arrives, followed by a manifest 954. A video manifest, or manifest file, is a text-based file that contains information about a video or audio stream. For example, it may be a Media Presentation Description (MPD) file and/or a UTF-8 Encoded Playlist (M3U8) file. The manifest file contains all the specific parts that should constitute the whole video, and provides a definite signal that the video recording has been fully uploaded. In this particular example, manifest 954 is deserialized to provide a list 955 of all part files that the stream processor should receive. By the time manifest 954 arrives, part10 for the next group to be transcribed has been received, but part9 and part11 are still missing. The stream processor 814 determines the composition of the last group based on the manifest and waits for part9 and part11, before transcribing group3 and providing a finalized signal 967 to finalize the session 968.

To mitigate instances where a part does not arrive as expected, state management can be implemented by stream processor 814 using session windows. A session window is a dynamic chunk of time periods which is kept alive, or a session that is kept alive, until the difference between the last two contiguous events goes beyond a predetermined delay. There is a session window per recording session ID. In one example, assuming an event was received 30 minutes ago, and the delay is set to one hour. The session is considered alive until another 30 minutes have elapsed and no new event has occurred. If another event is received within that time period, then the clock is reset at the new event to one hour for the session to close. If an event arrives beyond session window expiration, the event is considered an error. The concept of session windows and session timeout handles scenarios when for some reason some parts do not arrive or when the manifest does not arrive. Another concept used is a duplicate buffer timeout to handle duplicate events without creating a session that has already been finalized.

The WHISPER web service stream processor 834's main objective is to create, for a particular group of parts received from transcribe processor 814, a group-specific transcription 836 that is then stored into a temp directory or bucket in S3 838. Once transcribe processor 814 receives indication from WHISPER web service stream processor 834 that the transcription of a group is successful, a "transcribed" event is pushed into KAFKA 818. Transcribe processor 814 can also push dead-letter queue (DLQ) events if the transcription failed, or video_done events, if transcribe processor 814 receives a manifest file and the last group transcription has been completed. The KAFKA transcribed event is consumed by a partials processor 842, another Amazon Kinesis Data Streams (KDA) pipeline that takes these particular groupwise transcriptions from S3 838 and coalescing them together to create partials or partial transcriptions that are pushed back into a temporary bucket on S3 838. A partial is the collection of all group transcriptions completed so far for a media stream or a session, with proper alignment and padding between groups to account for continuity and filler words or non-speaking parts. Finally, when transcribe processor 814 receives the manifest and all groups have been pushed through the pipeline and transcribed, a video_done or completion event consumed by partials processor 842 causes the partials processor 842 to move the completed transcript into a finalized bucket on S3 838. In one embodiment, a partial transcript may be made accessible by the partials processor 842 to the playback app 850 before the completion of the video session.

Once a finalized signal from transcribe processor 814 is received by partials processor 842, partials processor 842 sends a signal to a queue watched by the playback application 850. Upon receipt of such a completion signal, playback app 850 may take further actions, for example, render and display the transcript with part-level or word-level time stamps on user agent 822. In some embodiments, as WHISPER does not give very accurate per-word timestamp, partials processor 842 may force align the output of WHISPER with the input audio to get a more accurate word-level timestamp. Playback client 850 may also respond to the user pressing an upload button, and may work with the partials inside the temporary bucket on S3 838 AI module 820 (e.g., OPENAI) for any speculative AI-based intelligence. FIGS. 17-19 provide further details on training and deploying a machine learning model, in accordance with embodiments of the present invention.

In summary, transcribe processor 814 is a chunk-grouping and state-management module, possibly implemented with an APACHE FLINK pipeline. FLINK is a distributed processing engine for stateful computations over unbounded and bounded data streams. The FLINK pipeline handles chunk groups, state management, and interfacing with the transcription service 834. Session windows in the FLINK pipeline ensure state is maintained and managed correctly. Transcription service 834 operates statelessly, focusing on chunk retrieval from S3 and the transcription task.

Specifically, transcribe processor 814 may use the FLINK pipeline to perform one or more of the following tasks:

1. Aggregating groups: combine or concatenate consecutive chunks into groups. For duplicated upload events created on KAFKA topic 810 by upload proxy 808 and S3 824, the FLINK pipeline dedupes the events.
2. Retaining Transcriptions: keep the last group transcription for use as a prompt for the next group.
3. Create sessions: create a new session for a recording media stream, and assert live session as new upload events arrive.
4. Calling transcription service: request transcription as each group of chunks is gathered or finalized.
5. Invoking partials' pipeline: on successful transcription of a group, send events to the partials' pipeline to consolidate the partials.
6. Determine the last group: on receiving a manifest file which indicates a recording has been fully uploaded, decide to wait for events or chunks that may still not have been received, given the non-first-in-first-out nature of event delivery.
7. Transcription finalization: if all files in the manifest match the state, send a finalization event to the partials' pipeline.
8. Error signaling and session timing-out: send an error signal if some chunks are not received, or send a TimeOut event if after waiting for a period of time, the events for missing chunks have not been received.
9. Maintaining State: hold onto the state until a finalization event occurs or a specified time period passes without receiving such an event.
10. Maintaining a session window: extend the expiration of the session window by a fixed amount of time with each new incoming event.

By comparison, transcription service module 834 provides transcription services via stateless microservices. Transcription processor 834 does not maintain any state. It is responsible for one of more of the following tasks:

1. Fetching chunks: retrieve groups of chunks from S3 824 based on request from transcribe processor 814.
2. Video transcoding: extract audio from input video chunks.
3. Transcribing groups of chunks: transcribing retrieved chunks, optionally using a provided prompt, by calling an automatic speech recognition (ASR) web service (e.g., WHISPER).

The ASR model (e.g., WHISPER) is a trained neural network that is pushed to a unified memory (e.g., CUDA) before it can be used. Instantiation of a WHISPER model involves downloading the model from storage and making it ready for transcription services. The same in-CUDA model is used to transcribe requests but always sequentially.

As the FLINK pipeline manages state, during execution, processing occurs on a per-recording session ID basis within a single designated thread. The FLINK pipeline facilitates a keyBy operation on the stream of events and shuffle events to the single designated thread. Such threads may then be spread among multiple physical nodes and multiple processors in these nodes for parallel processing. Being a stateless microservice, the transcription service (e.g., WHISPER) is inherently distributed. In other words, the FLINK pipeline distributes the events to multiple threads on multiple cores of multiple machines, but making sure that events for the same video ID always land on the same thread. In one example, a fan-out hash function is applied to a recording session video or media stream ID, so that every event for the same video ID lands in one of many particular parallel threads, distributing all received events for multiple video IDs across threads to minimize end-to-end latency. Effectively, a MapReduce is achieved, mapping the execution and reducing all mapped events into a single thread, enabling the handling of a large volume of events while maintaining the integrity of the transcription process for each video ID.

Furthermore, even if the upload deliveries are not in order, transcribe processor 814 implemented via FLINK ensures that all events in a group have been received before transcription service is requested. The state of recording media streams may be maintained by ensuring each machine has a local database (e.g., based on ROCKSDB) that allows the maintenance of state much beyond memory in the box.

Figure 10:
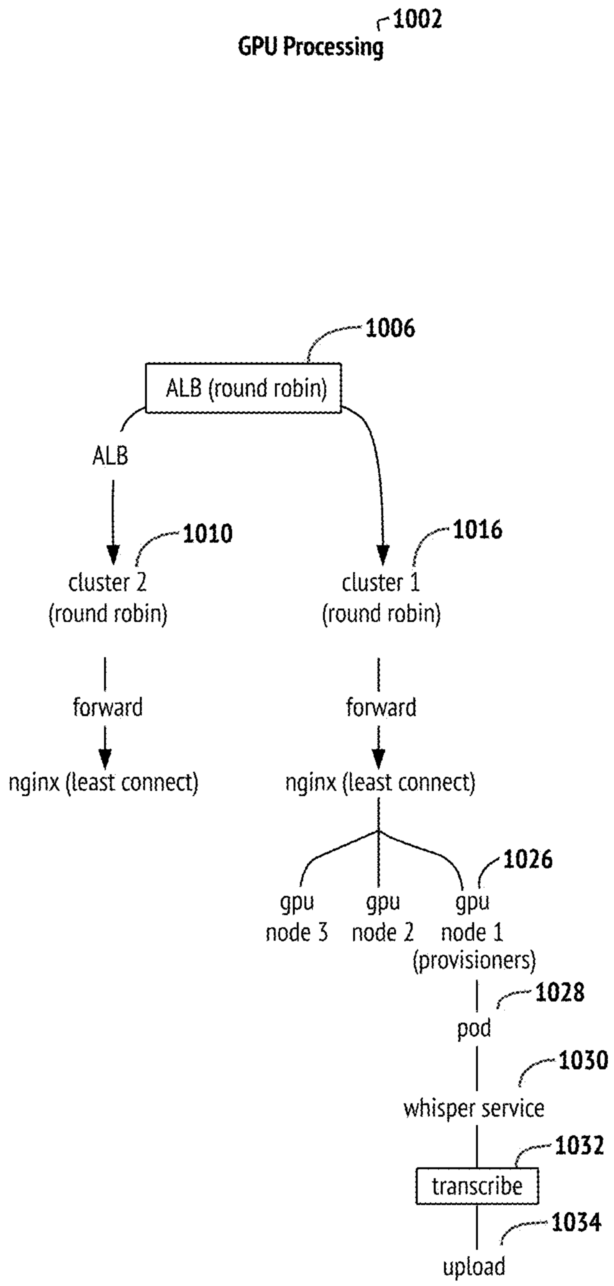
FIG. 10 shows an illustrative diagram depicting the selection of graphical processing units (GPUs) for instantaneous media stream transcription, according to one embodiment of the present invention.

FIG. 10 shows an illustrative architecture diagram depicting the selection of graphical processing units (GPUs) for instantaneous media stream transcription, according to one embodiment of the present invention. Specifically, FIG. 10 illustrates some of the GPU-related processing 1002 that enables AI-assisted transcription, according to one embodiment of the present invention. In this implementation, the WHISPER web service is deployed on EKS and utilizes an Application Load Balancer (ALB) 1006 to distribute requests across clusters (e.g., 1010 and 1016) with GPU-tainted nodes. Each GPU node (e.g., 1026) runs a pod (e.g., 1028) with a container that performs transcription (e.g., 1032) on part files. The service (e.g., 1030) may extract audio from S3, transcribe (e.g., 1032), and upload the transcription results (e.g., 1034). In some embodiments, specific types of GPUs are preferred during deployment (e.g., G5.xLarge, G4dns), based on end-to-end latency, memory reallocation, cost-to-speed ratio etc. In some embodiments, the system may ensure that transcription results are stored temporarily, with an SLA of seven days before deletion by S3.

FIG. 11 illustrates a flowchart for instantaneous media stream transcription, in accordance with an exemplary embodiment of the present invention. Specifically, FIG. 11 shows the steps carried out by a server within an instantaneous media stream transcription system, according to one embodiment of the present invention. In step 1102, the server establishes a communication channel between a user device and a server device. In step 1104, the server receives, through the communication channel from the user device, a media stream object containing a recording initiated on the user device, where the recording is received in segmented chunks at discrete time intervals from the user device. In step 1106, the server stores the segmented chunks of the recording to storage as the segmented chunks are received.

In step 1108, the server generates a partial transcript of the recording or updates the existing partial transcript as segmented chunks are received. In step 1110, the server receives a publication request for a complete video file from the user device at a publication request time. In step 1112, the server generates a complete transcript for the complete video file from the partial transcript and a manifest of the complete video file. Finally, in step 1114, the server provides access to the complete transcript for the complete video file to one or more viewers within an instant timeframe from the publication request time, where the instant timeframe is of constant order, independent of a length of the complete video file, and on an order of seconds.

FIG. 12 illustrates a flowchart for instantaneous media stream transcription, in accordance with another exemplary embodiment of the present invention. Specifically, FIG. 12 shows the steps carried out by a client within an instantaneous media stream transcription system, according to one embodiment of the present invention. In step 1202, the system establishes a communication channel between a user device and a server. In step 1204, the user device receives a hyperlink to a complete video file stored at the server, the complete video file containing a recording from an other user device. In step 1206, the user device receives a viewing request for viewing the recording. In step 1208, the user device transmits the viewing request to the server in response to receiving the viewing request. In step 1210, the user device receives, from the server, through the communication channel to the user device, a media stream object containing the recording from the other user device. In step 1212, the user device receives a complete transcript of the complete video file from the server. Finally, in step 1214, the user device provides for display the complete video file and the complete transcript accessible and ready for viewing within an instant time frame, where the instant time frame is of constant order, independent of a length of the complete video file, and on an order of seconds, from a time a publication request was made on the other user device.

Recorder Functionality

Embodiments of the present invention relate to methods and systems for sharing media such as audio, video, and images (e.g., screen-capture images) instantaneously and asynchronously. FIGS. 13, 14, 15, and 16 provide a detailed description of the recorder functionality pertinent to the methods and systems described herein, particularly the user device and recording server (see FIG. 1).

Figure 13:
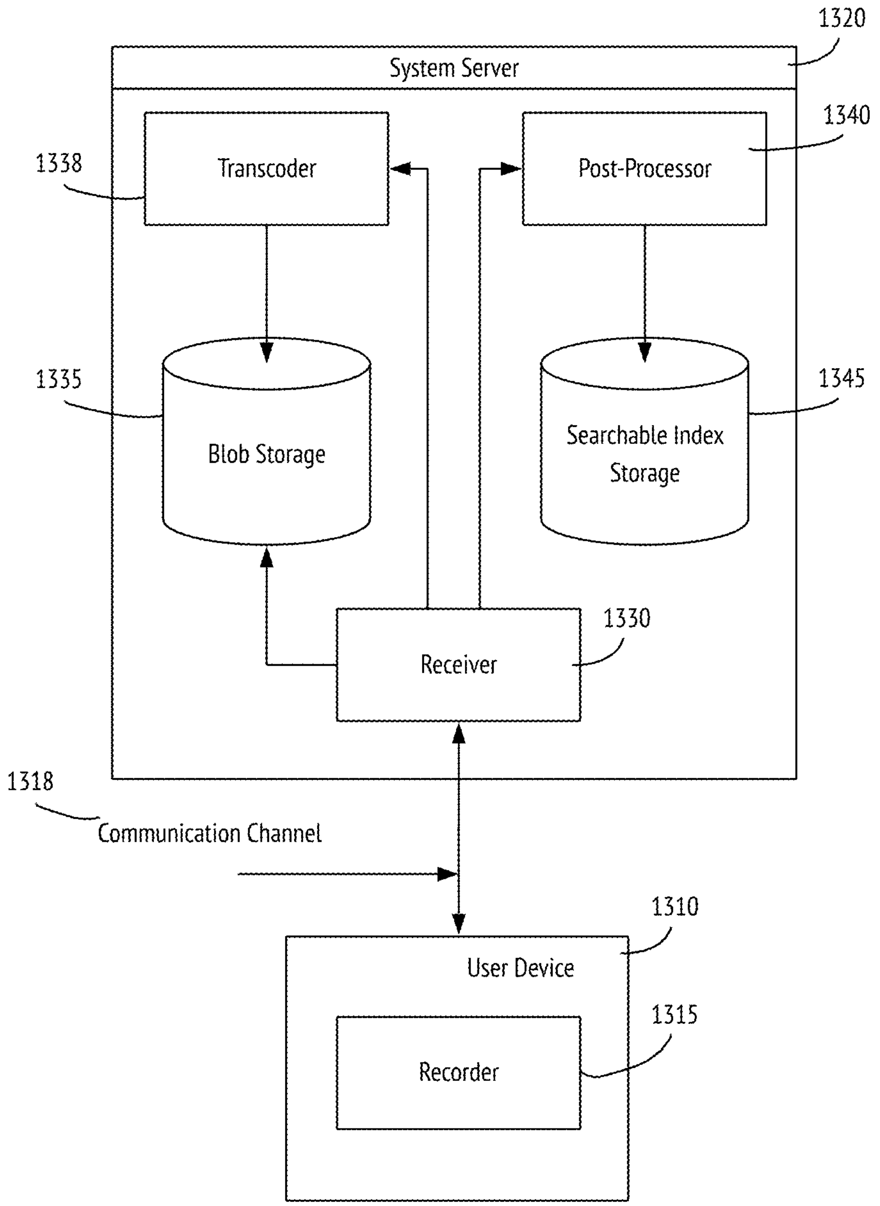
FIG. 13 is an illustrative system architecture diagram showing video recording functionality, according to one embodiment of the present invention.

FIG. 13 is an illustrative system architecture diagram showing video recording functionality, according to one embodiment of the present invention. A user device (1310) contains a recorder (1315) capable of recording from a display screen on the user device (1310), from an application displayed on the user device (1310), or from one or more optical cameras on the user device (1310). The user device (1310) is connected to a receiver (1330) within a system server (1320) through a communication channel (1318). The communication channel (1318) may be established between the user device (1310) and the system server (1320) before the recording is initiated, while the recording is taking place, or after the recording has been completed. The receiver (1330) may send the received recording directly to a storage unit such as a blob storage (1335) on the system server (1320). In some embodiments, such storage units may be permanent and may be used to store raw data or post-processed data such as transcoded data. In some embodiments, such storage units may be non-permanent, thus allowing temporary caching of the data stream while the data stream is handled by a post-processor, or post-processing pipeline, such as a dedicated transcoder (1338) or general post-processor (1340). Each of the transcoder (1338) or post-processor (1340) may be physical or logical components implemented in dedicated or general purpose hardware. In some embodiments, received data are first post-processed through a transcoder (1338) before the transcoded media recording is sent to blob storage (1335). Transcoding may be considered as a post-processing process, as raw or even post-process data is converted from one format to another. Concurrently or in tandem, the received recording may optionally be post-processed through a post-processor (1340), which may perform functions such as audio extraction, object detection, speech-to-text conversion, phoneme search, eye tracking, sentiment analysis, behavioral analysis, and gesture analysis. The post-processor may further be connected to optional searchable index storage (1345). Although not shown explicitly on the figure, post-processed media recordings generated by the post-processor (1340) may also be passed to the transcoder (1338), stored in the blob storage (1335), or sent to any other permanent or non-permanent storage units or control components that provide video hosting and sharing services such as on-demand replay, streaming, video searches, and user management.

The video recording architecture shown in FIG. 13 is responsible for pushing the media chunks discussed in FIGS. 8 and 9 to storage (e.g., S3). According to the embodiments discussed in FIGS. 8 and 9, the receipt of media chunks creates events on the publish-subscribe layer (e.g., KAFKA), thus triggering the transcription processes described above.

Figure 14:
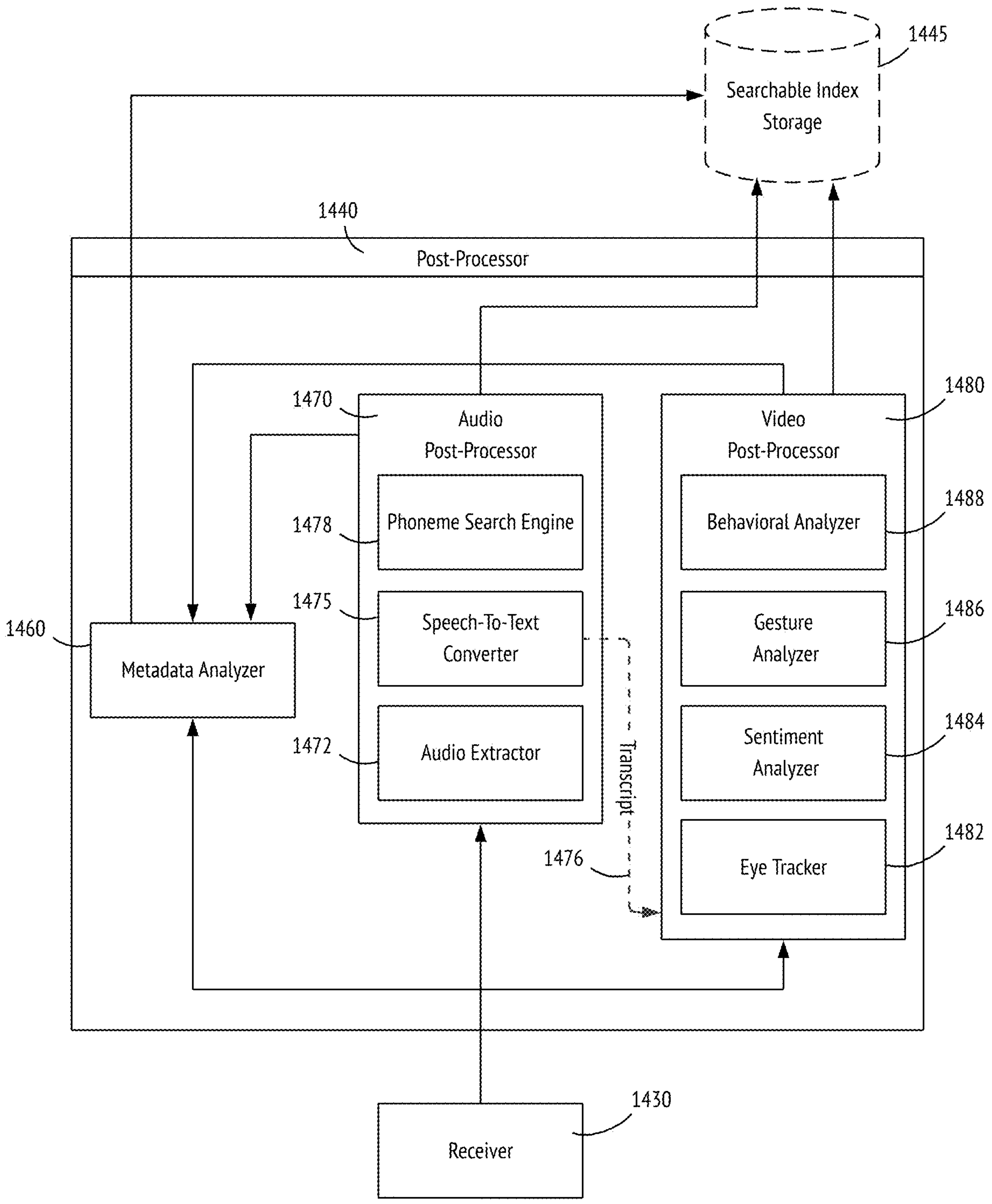
FIG. 14 is an illustrative architecture diagram for the video recording post-processor, according to one embodiment of the present invention.

FIG. 14 shows an illustrative architecture diagram for the post-processor (1440). In some embodiments, media data received at the receiver (1430) may be sent to a metadata analyzer (1460), an audio post-processor (1470), and/or a video post-processor (1480). The metadata analyzer (1460) analyzes any metadata that may already be present in the received media data and may further generate individual metadata items as needed. In the audio post-processor (1470), audio extraction may be performed by an audio extractor (1472), speech-to-text conversion may be done by a speech-to-text converter (1475), and phoneme search may be performed by a phoneme search engine (1478). Audio data may be processed concurrently or in tandem in different orders through these modules. In the video post-processor (1480), video features including, but not limited to, eye movements, sentiments, gestures, and behaviors, may be analyzed by an eye tracker (1482), a sentiment analyzer (1484), a gesture analyzer (1486), and a behavioral analyzer (1488). As in the audio post-processor, video data may be processed concurrently or in tandem in different orders through these modules. The audio post-processor (1470) and/or the video post-processor (1480) may feed their results back into the metadata analyzer (1460). In some embodiments, the received recording is streamed asynchronously as it is being recorded. In some embodiments, the received media data may be from an upload of a recorded media file. In both cases, a self-contained data unit containing information about the video file called a "metadata atom" may be used for playing a streamable media file. The metadata analyzer (1460) may generate a metadata atom in real-time as the media stream object is uploaded to the server if such a metadata atom does not already exist, or may move it in real-time to the beginning of a media file if such a metadata atom already exists. The metadata analyzer (1460) may write a new file with that metadata atom at the front into a searchable index storage (1445). The rest of the upload from the receiver, or processed versions from the video post-processor (1480), may be streamed and tacked onto that metadata atom so that the file is immediately ready for consumption and storage as soon as the upload completes.

In some embodiments, the speech-to-text converter (1475) may include the transcription processes described in FIGS. 8 and 9. Note that most recording-related analysis is usually carried out on the text representation of the audio and is hence located downstream of the speech-to-text converter (1475). For example, although sentiment analysis (1484) may be implemented through visual cues, robust analysis typically uses text (i.e., the transcript) to detect sentiment. Hence, in some embodiments, a number of meta-analysis blocks (e.g., 1484-1488) may receive an audio transcript (1476) as an input.

Figure 15:
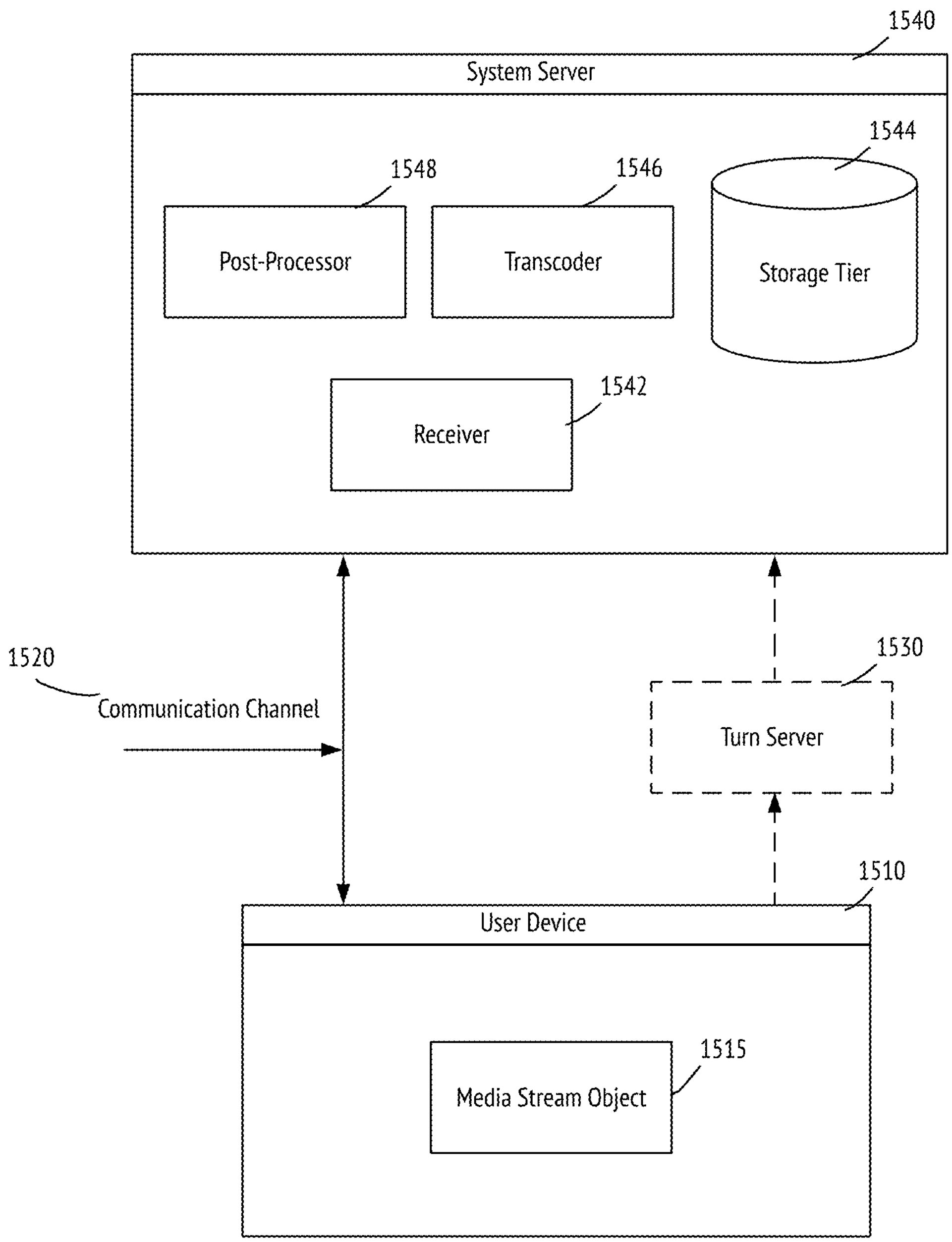
FIG. 15 is a block diagram illustrating data flow for curated media recording, according to one embodiment of the present invention.

More particularly, FIG. 15 shows a schematic block diagram illustrating data flow for curated media recordings, according to one embodiment of the present invention. A recording generated on a user device (1510) may include a combination of screen capture, front-facing camera capture, back-facing camera capture, and user annotations and dictations. Upon the start of a recording session, a screen display on the user device (1510), or any application running on the user device (1510) and displayed on the display screen, may be captured. A partner application on the user device (1510) may then set up a media stream object (1515) on the user device containing the recording, and upload the media stream object to a system server (1540) through a communication channel (1520) established between the user device (1510) and the system server (1540). The communication channel (1520) may employ any lossless transmission protocols such as WebSocket, or any lossy and potentially real-time protocols such as WebRTC. In some embodiments, a TURN server (1530) may optionally be needed when a lossy transmission protocol such as WebRTC is used, if symmetry between the two ends of the communication channel cannot be achieved, as is further described in U.S. Pat. No. 9,641,566. A receiver (1542) in the server 1540 receives the transmitted media stream object which contains media recording captured by the user device 1510. The received media recording may then be stored in a storage tier (1544) or may be sent to a transcoder (1546). The received media recording may also be sent to a post-processor (1548) before or in parallel with the transcoding process. Post-processed data or transcoded data may then be stored through a storage tier (1544). In other words, the storage tier (1544) may store raw or post-processed media recordings in any format appropriate for media storage and/or sharing. For example, the storage tier (1544) may be a blob storage. In some embodiments, the storage tier (1544) may be a content delivery tier, and the system server (1540) may serve as a node within a content delivery network (CDN). In some other embodiments, the system server (1540) may be connected to a CDN or to a parallel storage connected to a CDN for redundancy. Connection to and interaction with a CDN allows for immediate sharing of the raw recording content as soon as the recording process is completed. As previously discussed, while the media stream object (1515) is transmitted through the communication channel (1520) to the system server (1540), the system server (1540) may optionally initiate a post-processing pipeline internally by sending the received media recordings to the post-processor (1548). Furthermore, a recording user may instruct through the user device (1510) whether recorded content may be shared immediately.

Upon receipt of a publication request for the recorded content as collected from or input by the user through the user device (1510), the system server (1540) may end a currently progressing post-processing pipeline before making post-processed media content available. For example, in response to receiving the publication request, the system server (1540) may make the received raw recording or post-processed recording accessible to one or more viewers within an immediate time frame, where the immediate time frame is a time to upload or receive a remaining number of bytes to the server, from the publication request time, plus a time to complete processing the remaining number of bytes to generate a complete video file for download by one or more viewers at the server. In some embodiments, the system server (1540) may end the recording by continuing to receive the data recording upload until an end of file signal is detected, and start a new post-processing pipeline within the server to post-process the received recording. If immediate viewing of a raw, transcoded or post-processed media stream is desired, the previous step as discussed may be modified to stream raw data as received by the receiver (1542) to both the storage tier (1544) and/or the post-processing pipeline (1548) in parallel or in tandem. In other words, every process may be fully streamed, where media data is handled on a byte-by-byte, frame-by-frame, or segment-by-segment basis. As a post-processing pipeline is completed, post-processed recordings may be made accessible to one or more viewers. In some embodiments of the present invention, the post-processing pipeline may perform post-processing functions including, but not limited to, transcoding, audio extraction, video processing indexing, object detection, speech-to-text conversion, phoneme search, eye tracking, sentiment analysis, behavioral analysis, and/or gesture analysis. Thus, in some embodiments, the transcoder (1546) may be implemented as a particular instance of the post-processor (1548).

In some embodiments of FIG. 15, the transcription process described in FIGS. 8 and 9 is implemented as a separate module within the system server (1540).

FIG. 16 is a flowchart illustrating a process for instantaneous asynchronous media sharing, according to one embodiment of the present invention. Upon initiation, at step 1620, the system may establish a communication channel between a user device and a server. Next, at step 1630, the system receives a media stream object containing a recording of a screen of the user device through the communication channel, where the recording is received as it is recorded on the user device. The system further stores the recording to permanent storage as the recording is received by the server at step 1640. The system server may optionally initiate a post-processing pipeline to post-process the received recording. Whether with or without a post-processing pipeline, at step 1660, the system receives a publication request from the user device, where the publication request is received from a user through the user device at a publication request time. In response to receiving the publication request, at step 1670, the recording is made accessible to one or more viewers within an immediate, or "instant," time frame, where the immediate time frame is a time to upload a remaining number of bytes to the server from the publication request time plus a time to complete processing the remaining number of bytes to generate a complete video file ready for download by one or more viewers at the server. In other words, the recording is made accessible to the viewers through the generation of the complete video file from the recording, where the complete video file is ready for download from the server by one or more viewers. Such a generation process may involve simply completing the streamed upload of the recording and making it into a file entity, or may involve further post-processing steps as previously discussed.

While a recording is being made and uploaded, there may be different consumption patterns. In some embodiments, the consumption pattern is a live streaming from the recording user to the server, and through the server to the viewer. Consequently, the post-processing pipeline does not need to complete before the media is consumed. In some embodiments, the consumption pattern may be asynchronous video messaging, for which a subset of the post-processing pipeline must be finished or completed shortly or immediately after the publication request is received, in order for the post-processed recording to be made accessible. In some embodiments, the publication request is in the form of an end of transmission or end of file signal. In such cases, the post-processing process may be automatically completed upon the detection of such signals. Additionally, in some embodiments, a viewer may have the same access as the uploading user to open source or proprietary media container formats and players, such as a WEBM-playable browser, where WEBM is an open Media file format. The post-processing may then simply consist of uploading the video to a storage layer that backs it up to a CDN, and raw data may be consumed directly. In another example where a viewer's browser is not WEBM-playable, the post-processing may include a transcoding step, where a final conversion to the MPEG-4 or MP4 media format is performed, and metadata such as defined through a metadata atom is constructed as part of the streamed transcoding process. Metadata atoms are discussed in more specific embodiments in U.S. Pat. No. 9,641,566. In both cases, the time-to-consumption, when bytes are uploaded as soon as they are recorded, is the time it takes for the server to process the byte stream until the last byte is processed. The parallelism in recording, uploading, and streamed post-processing ensures that such time-to-consumption is so fast as to seem almost instantaneous. However, if transmission speeds are lower than optimal, then some down-sampling operations such as compressions may be performed on the recording data device first, and alternative communication protocols may be used, taking into account the quality of service desired, including but not limited to, error rate, throughput, and uplink and downlink transmission delays.

Alternative Embodiments

Embodiments of the present invention provide an artificial intelligence (AI) based system for the instantaneous transcription of a media (e.g., video, audio, etc.) stream for an online media recording and sharing service.

According to a first aspect, various systems, devices, servers, and apparatus for instantaneous media stream transcription are within the scope of the present invention. In one embodiment, a system for instantaneous media stream transcription is disclosed. The system may include at least one processor and a non-transitory storage medium storing program code. The program code may be executable by the at least one processor and may cause the at least one processor to execute a process for instantaneous media stream transcription.

Specifically, the program code may include code to establish a communication channel between a user device and a server device. The program code may also include code to receive by the server device, through the communication channel from the user device, a media stream object containing a recording initiated on the user device. The recording may be received in segmented chunks at discrete time intervals from the user device. The program code may also include code to store the segmented chunks of the recording to storage as the segmented chunks are received and update a partial transcript of the recording as segmented chunks are received. The program code may also include code to receive a publication request from the user device at a publication request time, and may generate a complete video file from a manifest and the segmented chunks, in response to receiving the publication request.

The program code may also include code to generate a complete transcript of the complete video file from the manifest and the partial transcript, and may provide access to the complete video file and the complete transcript to one or more viewers within an instant timeframe from the publication request time. The instant timeframe may be of constant order, independent of a length of the complete video file, and on an order of seconds.

In one embodiment, the instant timeframe is a time to upload a remaining number of bytes to the server device from the publication request time, plus a time to complete processing the remaining number of bytes to generate the complete video file, plus a time to update the manifest for the remaining number of bytes.

In another embodiment, the instant timeframe further includes a transcription delay for one or more segmented chunks.

In yet another embodiment, the non-transitory storage medium further includes program code to update a manifest of the recording as the segmented chunks of the recording are received by the server device at the discrete intervals, by appending an identifier for each segmented chunk to the manifest.

In one embodiment, the non-transitory storage medium further includes program code to provide the partial transcript for display at the user device as the segmented chunks are received.

In another embodiment, the program code to update the partial transcript of the recording is executed in response to a transcribed event, where the transcribed event is generated for a transcription of a pending completed group, and where a given completed group includes a plurality of ordered, consecutive segmented chunks.

In yet another embodiment, the non-transitory storage medium further includes program code to determine a group duration based on one or more AI model metrics of a multi-task multilingual automatic speech recognition (ASR) web service stream processor, and determine a size of the completed group based on a chunk duration and the group duration.

In one embodiment, the one or more AI metrics include a minimal accuracy window, where the minimal accuracy window is based on a word error rate of the AI model and an objective maximum word error rate.

In another embodiment, the non-transitory storage medium further includes program code to determine whether a completed group immediately prior to the pending completed group is successfully transcribed, in response to determining a completed group immediately prior to the pending completed group is successfully transcribed, initiate a transcription operation on the pending completed group by sending the pending completed group to an automatic speech recognition (ASR) webservice stream processor with a prompt, where the prompt instructs the ASR webservice stream processor to transcribe the pending completed group, and where the prompt includes a transcription of the completed group immediate prior to the pending completed group, post the transcript of the pending completed group to a temporary storage as soon as it is output by the ASR webservice stream processor, and send the transcribed event indicating the transcription of the pending completed group to an event stream processor.

In yet another embodiment, the non-transitory storage medium further includes program code to reset a transcription time-out window.

In one embodiment, the non-transitory storage medium further includes program code to execute a hash function on an identifier of the media stream object to identify a transcription thread dedicated to the media stream object.

In another embodiment, the program code to store the segmented chunks of the recording to storage includes program code to receive a segmented chunk through an upload proxy, and signal a stream processing platform of an upload event, in response to storing the segmented chunk received through the upload proxy.

In yet another embodiment, the program code to update the partial transcript of the recording further includes program code to update the partial transcript with a timestamp based on voice-detected pauses in speech.

In one embodiment, the non-transitory storage medium further includes program code to generate, using an artificial intelligence algorithm, a suggested title for the complete video file from the complete transcript.

According to a second aspect, various non-transitory storage media for instantaneous media stream transcription are within the scope of the present invention. In one embodiment, a non-transitory physical storage medium storing program code is disclosed. The program code may be executable by a processor to cause the processor to execute a computer-implemented process for instantaneous media stream transcription. The program code may include code to establish a communication channel between a user device and a server.

The program code may also include code to receive by the server, through the communication channel from the user device, a media stream object containing a recording initiated on the user device. The recording may be received in segmented chunks at discrete time intervals from the user device. The program code may also include code to store the segmented chunks of the recording to storage as the segmented chunks are received.

The program code may also include code to update a manifest of the recording as the segmented chunks of the recording are received by the server device at the discrete time intervals, by appending an identifier for each segmented chunk to the manifest.

The program code may also include code to generate a transcribed event for a transcription of a pending completed group which includes a plurality of ordered, consecutive segmented chunks, where a pending completed group size is determined based on a minimal accuracy window metric of a multi-task multilingual automatic speech recognition (ASR) web service stream processor comprising an AI model.

The program code may also include code to generate a partial transcript of the recording or update the partial transcript of the recording as segmented chunks are received. The program code may also display the partial transcript at the user device as the segmented chunks are received.

The program code may also include code to receive a publication request from the user device at a publication request time.

The program code may also include code to generate a complete video file from a manifest and the segmented chunks, in response to receiving the publication request. The program code may also include code to generate a complete transcript of the complete video file from the manifest and the partial transcript. The program code may also include code to provide access to the complete video file and the complete transcript to one or more viewers within an instant timeframe from the publication request time. The instant timeframe may be of constant order, independent of a length of the complete video file, and on an order of seconds.

The various features described above with respect to the system apply analogously to the non-transitory storage medium.

According to a third aspect, various methods, processes, and algorithms for instantaneous media stream transcription are within the scope of the present invention. In one embodiment, a computer-implemented method for instantaneous media stream transcription by a server is disclosed. The method may include establishing a communication channel between a user device and the server. The method may include receiving by the server, through the communication channel from the user device, a media stream object containing a recording initiated on the user device. The recording may be received in segmented chunks at discrete time intervals from the user device.

The method may also include storing the segmented chunks of the recording to storage as the segmented chunks are received. The method may also include updating a partial transcript of the recording as segmented chunks are received. The method may also include receiving a publication request from the user device at a publication request time. The method may also include generating a complete video file from a manifest and the segmented chunks, in response to receiving the publication request.

The method may also include generating a complete transcript from the manifest and the partial transcript. The method may also include providing access to the complete video file and the complete transcript to one or more viewers within an instant timeframe from the publication request time. The instant timeframe may be of constant order, independent of a length of the complete video file, and on an order of seconds.

The various features described above with respect to the system apply analogously to the method.

According to a fourth aspect, a non-transitory physical storage medium storing program code is disclosed, the program code executable by a processor to cause the processor to execute a computer-implemented process for instantaneous media stream transcription by a user device. The program code may include code to establish a communication channel between a user device and a server. The program code may include code to receive, at the user device, a hyperlink to a complete video file stored at the server, the complete video file containing a recording from an other user device. The program code may also include code to receive, at the user device, a viewing request for viewing the recording. The program code may also include code to transmit the viewing request from the user device to the server in response to receiving the viewing request. The program code may also include code to receive, from the server, through the communication channel to the user device, a media stream object containing the recording from the other user device.

The program code may also include code to receive, at the user device, a complete transcript of the complete video file from the server. The program code may also include code to provide for display the complete video file and the complete transcript accessible and ready for viewing at the user device within an instant time frame, where the instant time frame is of constant order, independent of a length of the complete video file, and on an order of seconds, from a time a publication request was made on the other user device.

According to a fifth aspect, a non-transitory physical storage medium storing program code is disclosed, the program code executable by a processor to cause the processor to execute a computer-implemented process for instantaneous media stream transcription by a user device. The program code may include code to establish a communication channel between the user device and a server. The program code may also include code to receive a recording request at the user device, and initiate a recording on the user device in response to receiving the recording request.

The program code may also include code to transmit, to the server, through the communication channel from the user device, a media stream object containing the recording initiated on the user device, where the recording is uploaded from the user device as it is recorded on the user device, and where the recording is transmitted in segmented chunks by the user device at discrete intervals. The program code may also include code to receive a publication request at the user device at a publication request time. The program code may also include code to transmit the publication request and a manifest from the user device to the server, in response to receiving the publication request. The program code may also include code to receive a hyperlink to a complete video file stored at the server.

The program code may also include code to receive a complete transcript of the complete video file from the server. The program code may also include code to provide for display the complete video file and the complete transcript accessible and ready for viewing at the user device within an instant time frame, where the instant time frame is of constant order, independent of a length of the complete video file, and on an order of seconds.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention use one or more artificial intelligence (AI) and machine learning (ML) algorithms for instantaneous media stream transcription. Various exemplary ML algorithms are within the scope of the present invention. The following description describes illustrative ML techniques for implementing various embodiments of the present invention.

Illustrative AI/ML Models Based on Neural Networks

Although there are various types of AI/ML models that are within the scope of the present invention, an illustrative example using neural network-based AI/ML models is discussed next. A neural network is a computational model inspired by the structure of the human brain, consisting of interconnected units called neurons that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 17 describes fundamental neural network operation as it relates to an instantaneous media stream transcription system, according to exemplary embodiments of the present invention.

FIG. 17 shows a single-layered neural network, also known as a single-layer perceptron. Such a perceptron is the building block for neural networking layers included in a transcriber model, according to embodiments of the present invention. The operation of a single-layered neural network involves the following steps:

1. Input: Receiving an input vector v 1704 with elements $v_j$, with $j \in [1, n]$ representing the $j^{th}$ input, and where each element of the vector corresponds to a neuron 1706 in the input layer. In an instantaneous media stream transcription system, the input vector may be a prompt or links to media chunks.
2. Transfer Function: Multiplying each input by a corresponding weight $w_j$ 1708. These weighted inputs are then summed together as the transfer function, yielding the net input to the activation function $$\sum_{j=1}^{n} v_j \cdot w_j \text{ 1710.}$$

Each neuron in a neural network may have a bias value 1712, which is added to the weighted sum of the inputs to that neuron. Both the weights and bias values are learned during the training process. The purpose of the bias is to provide every neuron with a trainable constant value that can help the model fit the data better. With biases, the net input to the activation function is $$\sum_{j=1}^{n} \{v_j \cdot w_j\} + b.$$

3. Activation Function: Passing the net input through an activation function 1714. The activation function σ determines the activation value o 1718, which is the output of the neuron. It is typically a non-linear function such as a sigmoid or ReLU (Rectified Linear Unit) function. The threshold θ 1716 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.
4. Output: The activation value o 1718 is the output of the activation function. This value is what gets passed on to the next layer in the network or becomes the final output in the case of the last layer. In an instantaneous media stream transcription system, the final output of the neural network may be an embedding or context vector representing a partial transcript of a media stream.

FIG. 18 shows an overview of the neural network training process that can be used in an instantaneous media stream transcription system, according to exemplary embodiments of the present invention.

In an instantaneous media stream transcription system, the neural network 1802 undergoing the training may be a transcriber model, as described in the present disclosure. The training of a neural network involves repeatedly updating the weights and biases 1810 of the network to minimize the difference between the predicted output 1804 and the true or target output 1806, where the predicted output 1804 is the result produced by the network when a set of inputs from a dataset is passed through it. The true or target output 1806 is the true desired result. The difference between the predicted output and the true output is calculated using a loss function 1808, which quantifies the error made by the network in its predictions. In an instantaneous media stream transcription system, the predicted 1804 and true/target outputs 1806 of the neural network may be an embedding or context vector representing a group transcript.

The loss function is a part of the cost function 1808, which is a measure of how well the network is performing over the whole dataset. The goal of training is to minimize the cost function 1808. This is achieved by iteratively adjusting the weights and biases 1810 of the network in the direction that leads to the steepest descent in the cost function. The size of these adjustments is determined by the learning rate 1808, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 1810 of the network based on the error (e.g., cost function) 1808 of the output. After forward propagation through neural network 1802, the output 1804 of the network is compared with true output 1806, and the error 1808 is calculated. This error is then propagated back through the network, starting from the output layer and moving towards the input layer. The weights and biases 1810 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

FIG. 19 provides additional details on the training process, according to exemplary embodiments of the present invention.

Transformer Model Architecture

The transformer architecture, as may be used by an embodiment of the transcriber model discussed herein, is a neural network design that was introduced in the paper "Attention is All You Need" by Vaswani et al. (available at Arxiv: 1706.03762) published in June 2017, and incorporated herein by reference as if fully set forth herein. Large Language Models (LLMs) heavily rely on the transformer architecture.

The architecture (see FIG. 1 of the referenced paper) is based on the concept of "attention," allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens." This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding," transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding." Therefore, the training of a neural network and its evaluation (i.e., its use upon deployment) both occur within the embeddings space.

In the remainder of this document, the processes of tokenization, encoding, decoding, and detokenization are assumed. In other words, the processes described below occur in the "embeddings space." Hence, while the tokenization and encoding of training data and input prompts may not be represented or discussed explicitly, they are implied. Similarly, the decoding and detokenization of neural network outputs is also implied.

Training and Fine-Tuning Machine Learning (ML) Modules

FIG. 19 is an illustrative flow diagram showing the different phases and datasets involved in training a machine learning algorithm for an instantaneous media stream transcription system, according to exemplary embodiments of the present invention.

The training process begins at step 1910 with the acquisition, retrieval, assimilation, or generation of scenario and conversation data. At step 1920, acquired data are preprocessed, or prepared. At step 1930, the ML model (e.g., transcriber model) is trained using training data 1925. At step 1940, the ML model is evaluated, validated, and tested, and further refinements to the ML model are fed back into step 1930 for additional training. Once its performance is acceptable, at step 1950, optimal model parameters are selected.

Training data 1925 is a documented data set containing multiple instances of system inputs and correct outcomes. It trains the ML model to optimize the performance for a specific target task. In FIG. 19, training data 1925 may also include subsets for validating and testing the ML model, as part of the training iterations 1930 and 1940. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via an augmentation process.

In some embodiments, an additional fine-tuning 1960 phase including iterative fine-tuning 1960 and evaluation, validation, and testing 1970 steps, is carried out using fine-tuning data 1955. Fine-tuning in machine learning is a process that involves taking a selected 1950 pre-trained model and further adjusting or "tuning" its parameters to better suit a specific task or fine-tuning dataset 1955. This technique is particularly useful when dealing with deep learning models that have been trained on large, general training datasets 1925 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 1925, such as ImageNet for image recognition tasks. The model's existing weights, which have been learned from the original training, serve as the starting point. During fine-tuning, the model is trained further on a new fine-tuning dataset 1955, which may contain different classes or types of data than the original training set. This additional training phase allows the model to adjust its weights to better capture the characteristics of the new fine-tuning dataset 1955, thereby improving its performance on the specific task it is being fine-tuned for.

In some embodiments, additional test and validation 1980 phases are carried out using test and validation data 1975. Testing and validation of a ML model both refer to the process of evaluating the model's performance on a separate dataset 1975 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the model is trained 1930, selected 1950, and optionally fine-tuned 1960 and validated/tested 1980, it is deployed 1990. Deployed ML models such as the transcriber model 1995 usually receive new data 1985 that was pre-processed 1920.

In machine learning, data preprocessing 1920 is tailored to the phase of model development. During model training 1930, pre-processing involves cleaning, normalizing, and transforming raw data into a format suitable for learning patterns. For fine-tuning 1960, pre-processing adapts the data to align with the distribution of the specific targeted task, ensuring the pre-trained model can effectively transfer its knowledge. Validation 1980 pre-processing mirrors that of training to accurately assess model generalization without leakage of information from the training set. Finally, in deployment (1990 and 1995), pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "Understanding Large Language Models—A Transformative Reading List," by S. Raschka (posted Feb. 7, 2023, available at sebastianraschka.com), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may, for example, be in direct or indirect communication with one another over the same or different wired or wireless networks. Additionally, while FIGS. 20 and 21 illustrate the various system entities as separate, standalone entities, the various embodiments are not limited to this particular architecture.

Exemplary Management Computing Entity

Figure 20:
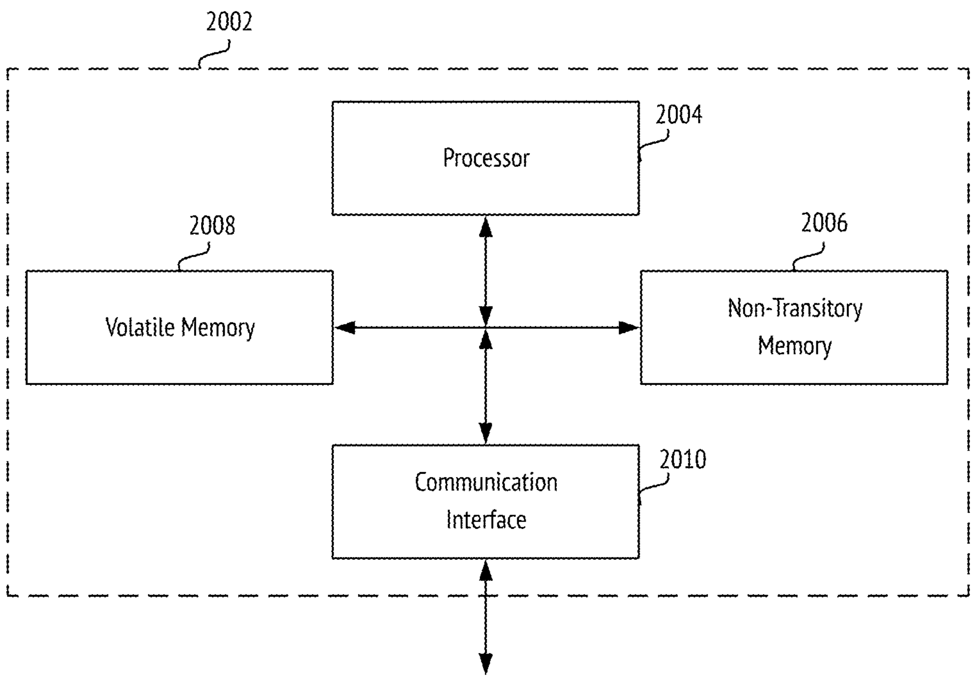
FIG. 20 provides a schematic of a server (management computing entity) for web-hosted recording according to one embodiment of the present invention.
Figure 21:
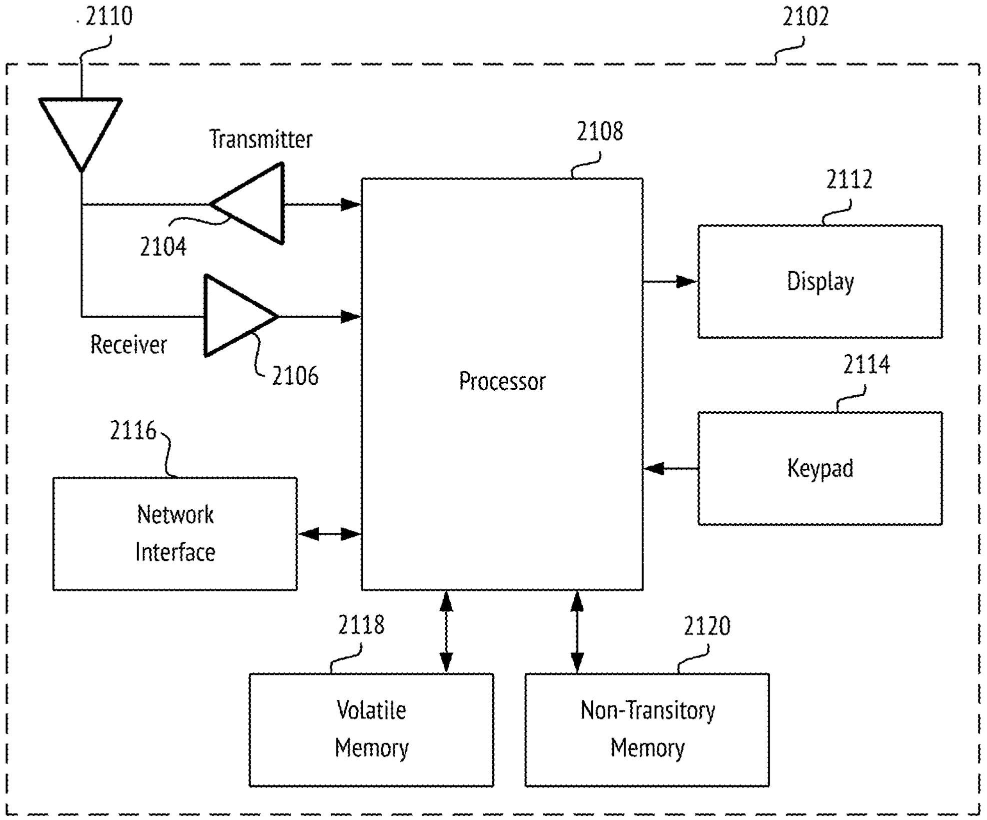
FIG. 21 provides an illustrative schematic representation of a web-hosted recording client (user computing entity) that can be used in conjunction with embodiments of the present invention.

FIG. 20 provides a schematic of a server (management computing entity, 2002). Specifically, FIG. 20 provides a schematic of a server (management computing entity) for web-hosted recording according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (2002) may also include one or more communications interfaces (2010) for communicating with various computing entities, such as by communicating data, content, and/or information (similar terms used herein interchangeably) that can be transmitted, received, operated on, processed, displayed, stored, and/or the like.

As shown in FIG. 20, in one embodiment, the management computing entity (2002) may include or be in communication with one or more processors (i.e., processing elements, 2004, also referred to as processors and/or processing circuitry, and similar terms used herein interchangeably) that communicate with other elements within the management computing entity (2002) via a bus, for example. The processor (2004) may be embodied in a number of different ways. For example, the processor (2004) may be embodied as one or more complex programmable logic devices (CPLDs), microprocessors, multi-core processors, co-processing entities, application-specific instruction-set processors (ASIPs), microcontrollers, and/or controllers. Further, the processor (2004) may be embodied as one or more other processing devices or circuitry. The term circuitry may refer to an entire hardware embodiment or to a combination of hardware and computer program products. Thus, the processor (2004) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (2004) may be configured for a particular use or configured to execute instructions stored in volatile or non-volatile (or non-transitory) media or otherwise accessible to the processor (2004). As such, whether configured by hardware or computer program products, or by a combination thereof, the processor (2004) may be capable of performing steps or operations according to embodiments of the present disclosure when configured accordingly.

In one embodiment, the management computing entity (2002) may further include or be in communication with non-transitory memory (also referred to as non-volatile media, non-volatile storage, non-transitory storage, memory, memory storage, and/or memory circuitry-similar terms used herein interchangeably). In one embodiment, the non-transitory memory or storage may include one or more non-transitory memory or storage media (2006), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The non-volatile (or non-transitory) storage or memory media may store databases, database instances, database management systems, data, applications, programs, program modules, scripts, source code, object code, byte code, compiled code, interpreted code, machine code, executable instructions, and/or the like. The terms database, database instance, and/or database management system (similar terms used herein interchangeably) may refer to a collection of records or data stored in a computer-readable storage medium using one or more database models, such as a hierarchical database model, a network model, a relational model, an entity-relationship model, an object model, a document model, a semantic model, a graph model, and/or the like.

In one embodiment, the management computing entity (2002) may further include or be in communication with volatile media (also referred to as volatile storage, memory, memory storage, memory and/or circuitry-similar terms used herein interchangeably). In one embodiment, the volatile storage or memory may also include one or more volatile storage or memory media 2008, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (2004). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (2002) with the assistance of the processor (2004) and operating system.

As indicated, in one embodiment, the management computing entity (2002) may also include one or more communications interfaces (2010) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (2002) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown in the figure, the management computing entity (2002) may include or be in communication with one or more input elements, such as a keyboard input, a mouse input, a touch screen/display input, a motion input, a movement input, an audio input, a pointing device input, a joystick input, a keypad input, and/or the like. The management computing entity (2002) may also include or be in communication with one or more output elements (not shown), such as an audio output, a video output, a screen/display output, a motion output, a movement output, and/or the like.

Furthermore, one or more of the components of the management computing entity (2002) may be located remotely from other management computing entity (2002) components, such as in a distributed system. One or more of the components may be combined and additional components performing functions described herein may be included in the management computing entity (2002). Thus, the management computing entity (2002) can be adapted to accommodate a variety of needs and circumstances. These architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 21 provides an illustrative schematic representation of a client (user computing entity, 2102) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (2102) can be operated by various parties. As shown in FIG. 21, the user computing entity (2102) can include an antenna (2110), a transmitter (2104) (e.g., radio), a receiver (2106) (e.g., radio), and a processor (i.e., processing element) (2108) (e.g., CPLDs, microprocessors, multi-core processors, co-processing entities, ASIPs, microcontrollers, and/or controllers) that provides signals to and receives signals from the transmitter (2104) and receiver (2106), respectively.

The signals provided to and received from the transmitter (2104) and the receiver (2106), respectively, may include signaling information in accordance with air interface standards of applicable wireless systems. In this regard, the user computing entity (2102) may be capable of operating with one or more air interface standards, communication protocols, modulation types, and access types. More particularly, the user computing entity (2102) may operate in accordance with any of a number of wireless communication standards and protocols, such as those described above with regard to the management computing entity (2002). In a particular embodiment, the user computing entity (2102) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (2102) may operate in accordance with multiple wired communication standards and protocols, such as those described above with regard to the management computing entity (2002) via a network interface (2116).

Through these communication standards and protocols, the user computing entity (2102) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (2102) can also download changes, add-ons, and updates, for instance, to its firmware, software (e.g., including executable instructions, applications, program modules), and operating system.

According to one embodiment, the user computing entity (2102) may include location determining aspects, devices, modules, functionalities, and/or similar words used herein interchangeably. For example, the user computing entity (2102) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the position of the user computing entity (2102) in connection with a variety of other systems, including cellular towers, Wi-Fi access points, and/or the like. Similarly, the user computing entity (2102) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. Such technologies may include the iBeacons, Gimbal proximity beacons, Bluetooth Low Energy (BLE) transmitters, NFC transmitters, and/or the like. These indoor positioning aspects can be used in a variety of settings to accurately determine, within inches or centimeters, the location of someone or something.

The user computing entity (2102) may also include a user interface, which can include a display (2112) coupled to a processor (2108) and/or a user input interface coupled to a processor (2108). For example, the user interface may be a user application, browser, user interface, and/or similar words used herein interchangeably executing on and/or accessible via the user computing entity (2102) in order to interact with and/or cause display of information from the management computing entity (2002), as described herein. The user input interface can include any of a number of devices or interfaces allowing the user computing entity (2102) to receive data, such as a keypad (2114) (hard or soft), a touch display, voice/speech or motion interfaces, or other input device. In embodiments including a keypad (2114), the keypad (2114) can include (or cause display of) the conventional numeric (0-9) and related keys (#, *), and other keys used for operating the user computing entity (2102) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (2102) can also include volatile storage or memory (2118) and/or non-transitory storage or memory (2120), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (2102). As indicated, this may include a user application that is resident on the entity or accessible through a browser or other user interface for communicating with the management computing entity (2002) and/or various other computing entities.

In another embodiment, the user computing entity (2102) may include one or more components or functionalities that are the same or similar to those of the management computing entity (2002), as described in greater detail above. As will be recognized, these architectures and descriptions are provided for exemplary purposes only and are not limiting to the various embodiments.

Exemplary Client Server Environment

Figure 22:
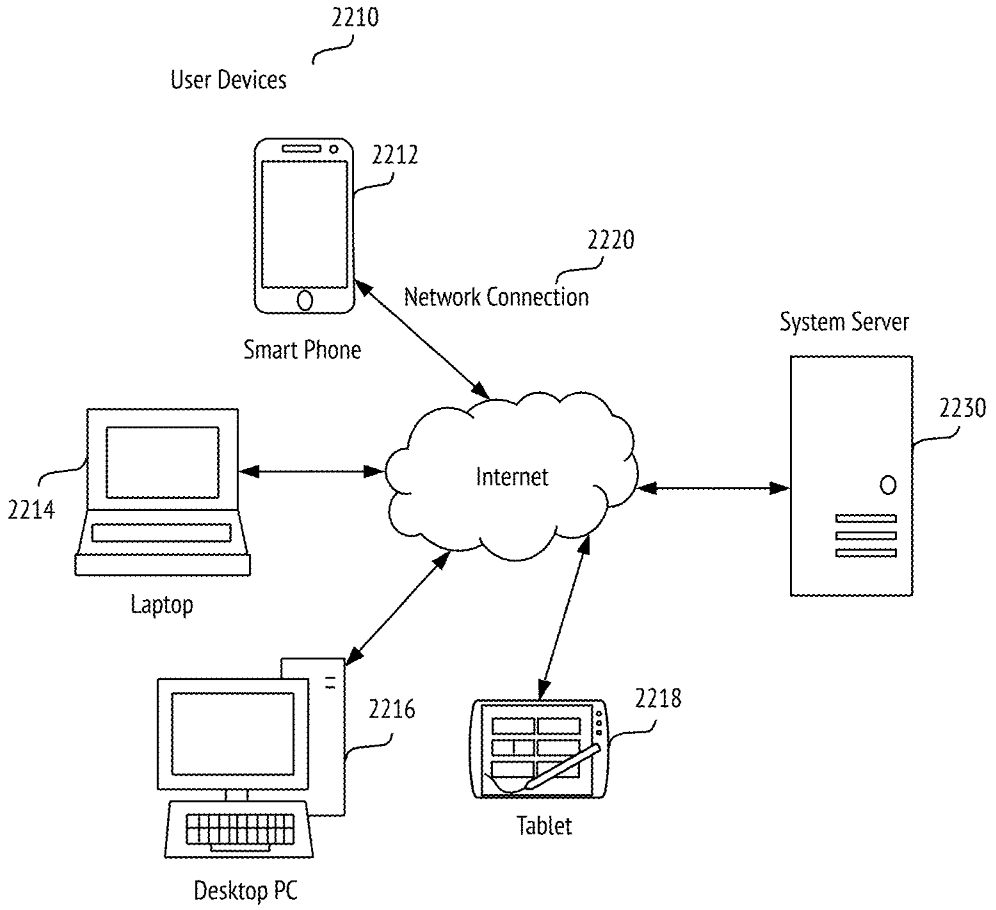
FIG. 22 shows an illustrative system architecture diagram for implementing one embodiment of web-hosted recording in a client-server environment.

The present invention may be implemented in a client server environment. FIG. 22 shows an illustrative system architecture diagram for implementing one embodiment of web-hosted recording in a client-server environment. User devices (i.e., image-capturing device) (2210) on the client side may include smartphones (2212), laptops (2214), desktop PCs (2216), tablets (2218), or other devices. Such user devices (2210) access the service of the system server (2230) through some network connection (2220), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In general, the method executed to implement the embodiments of the invention, may be implemented as part of an operating system or a specific application, component, program, object, module or sequence of instructions referred to as "computer program(s)" or "computer code(s)." The computer programs typically include one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes, parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances. Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" in various places throughout this specification are not necessarily all referring to the same embodiment.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for instantaneous media stream transcription, comprising:

at least one processor; and a non-transitory storage medium storing program code, the program code executable by the at least one processor to cause the at least one processor to execute a process for instantaneous media stream transcription, the program code comprising code to:

establish a communication channel between a user device and a server device;

receive by the server device, through the communication channel from the user device, a media stream object containing a recording initiated on the user device, wherein the recording is received in segmented chunks at discrete time intervals from the user device;

store the segmented chunks of the recording to storage as the segmented chunks are received;

generate a partial transcript of the recording or update an existing partial transcript as segmented chunks are received;

receive a publication request for a complete video file from the user device at a publication request time;

generate a complete transcript for the complete video file of the recording from the partial transcript and a manifest of the complete video file; and provide access to the complete transcript for the complete video file to one or more viewers within an instant timeframe from the publication request time, wherein the instant timeframe is of constant order, independent of a length of the complete video file, and on an order of seconds.

2. The system of claim 1, wherein the instant timeframe is a time to upload a remaining number of bytes to the server device from the publication request time, plus a time to complete processing the remaining number of bytes to generate the complete video file, plus a time to update the manifest for the remaining number of bytes.

3. The system of claim 1, wherein the non-transitory storage medium further comprises program code to:

update the manifest of the recording as the segmented chunks of the recording are received by the server device at the discrete time intervals, by appending an identifier for each segmented chunk to the manifest.

4. The system of claim 1, wherein the non-transitory storage medium further comprises program code to:

provide the partial transcript for display at the user device as the segmented chunks are received.

5. The system of claim 1, wherein the program code to update the partial transcript of the recording is executed in response to a transcribed event, wherein the transcribed event is generated for a transcription of a pending completed group, and wherein a given completed group comprises a plurality of ordered, consecutive segmented chunks.

6. The system of claim 5, wherein the non-transitory storage medium further comprises program code to:

determine a group duration based on one or more artificial intelligence (AI) model metrics of a multi-task multilingual automatic speech recognition (ASR) web service stream processor comprising an AI model; and determine a size of the given completed group based on a chunk duration and the group duration.

7. The system of claim 6, wherein the one or more AI model metrics comprise a minimal accuracy window, and wherein the minimal accuracy window is based on a word error rate (WER) of the AI model and an objective maximum word error rate.

8. The system of claim 7, wherein the non-transitory storage medium further comprises program code to:

determine whether a completed group immediately prior to the pending completed group is successfully transcribed;

in response to determining whether the completed group immediately prior to the pending completed group is successfully transcribed, initiate a transcription operation on the pending completed group by sending the pending completed group to an automatic speech recognition (ASR) webservice stream processor with a prompt, wherein the prompt instructs the ASR webservice stream processor to transcribe the pending completed group, and wherein the prompt comprises a transcription of the completed group immediate prior to the pending completed group;

post the transcription of the pending completed group to a temporary storage as soon as it is output by the ASR webservice stream processor; and send the transcribed event indicating the transcription of the pending completed group to an event stream processor.

9. The system of claim 1, wherein a time-out window is reset at the discrete time intervals, and wherein an error is declared if the time-out window exceeds a predetermined delay.

10. The system of claim 1, wherein the non-transitory storage medium further comprises program code to:

execute a hash function on an identifier of the media stream object to identify a transcription thread dedicated to the media stream object.

11. The system of claim 1, wherein the program code to store the segmented chunks of the recording to storage comprises program code to:

receive a given segmented chunk through an upload proxy; and signal a stream processing platform of an upload event, in response to storing the given segmented chunk received through the upload proxy.

12. The system of claim 1, wherein the program code to update the partial transcript of the recording further comprises program code to update the partial transcript with a timestamp based on voice-detected pauses in speech.

13. The system of claim 1, wherein the non-transitory storage medium further comprises program code to:

generate, using an artificial intelligence algorithm, a suggested title for the complete video file from the complete transcript.

14. The system of claim 1, wherein the non-transitory storage medium further comprises program code to:

generate the complete video file from the segmented chunks and the manifest, in response to receiving the publication request; and provide access to the complete video file and the complete transcript to the one or more viewers within the instant timeframe from the publication request time.

15. A non-transitory physical storage medium storing program code, the program code executable by a processor to cause the processor to execute a computer-implemented process for instantaneous media stream transcription, the program code comprising code to:

establish a communication channel between a user device and a server device;

receive by the server device, through the communication channel from the user device, a media stream object containing a recording initiated on the user device, wherein the recording is received in segmented chunks at discrete time intervals from the user device;

store the segmented chunks of the recording to storage as the segmented chunks are received;

update a manifest of the recording as the segmented chunks of the recording are received by the server device at the discrete time intervals, by appending an identifier for each segmented chunk to the manifest;

generate a transcribed event for a transcription of a pending completed group which comprises a plurality of ordered, consecutive segmented chunks, wherein a pending completed group size is determined based on a minimal accuracy window metric of a multi-task multilingual automatic speech recognition (ASR) web service stream processor comprising an AI model;

generate a partial transcript of the recording or update an existing partial transcript as segmented chunks are received in response to the transcribed event;

display the partial transcript at the user device as the segmented chunks are received;

receive a publication request for a complete video file of the recording from the user device at a publication request time;

generate a complete transcript for the complete video file of the recording from the manifest and the partial transcript; and provide access to the complete transcript for the complete video file to one or more viewers within an instant timeframe from the publication request time, wherein the instant timeframe is of constant order, independent of a length of the complete video file, and on an order of seconds.

16. A computer-implemented method for instantaneous media stream transcription, comprising:

establishing a communication channel between a user device and a server device;

receiving by the server device, through the communication channel from the user device, a media stream object containing a recording initiated on the user device, wherein the recording is received in segmented chunks at discrete time intervals from the user device;

storing the segmented chunks of the recording to storage as the segmented chunks are received;

generating a partial transcript of the recording or updating the partial transcript of the recording as segmented chunks are received;

receiving a publication request for a complete video file of the recording from the user device at a publication request time;

generating a complete transcript for the complete video file from the partial transcript and a manifest of the complete video file; and providing access to the complete video file and the complete transcript to one or more viewers within an instant timeframe from the publication request time, wherein the instant timeframe is of constant order, independent of a length of the complete video file, and on an order of seconds.

17. The computer-implemented method of claim 16, wherein the instant timeframe is a time to upload a remaining number of bytes to the server device from the publication request time, plus a time to complete processing the remaining number of bytes to generate the complete video file, plus a time to update the manifest for the remaining number of bytes, and wherein the instant timeframe further includes a transcription delay for one or more segmented chunks.

18. The computer-implemented method of claim 16, wherein updating the partial transcript of the recording is executed in response to a transcribed event, wherein the transcribed event is generated for a transcription of a pending completed group, wherein a given completed group comprises a plurality of ordered, consecutive segmented chunks, and wherein the method further comprises:

determining a group duration based on one or more AI model metrics of a multi-task multilingual automatic speech recognition (ASR) web service stream processor; and determining a size of the given completed group based on a chunk duration and the group duration.

19. The computer-implemented method of claim 16, further comprising:

providing the partial transcript for display at the user device as the segmented chunks are received.

* * * * *